(12) United States Patent
Mu

(10) Patent No.: US 11,706,597 B2
(45) Date of Patent: Jul. 18, 2023

(54) ALLOCATING RESOURCES FOR TRANSMITTING MTC SYSTEM INFORMATION

(71) Applicant: BEIJING XIAOMI MOBILE SOFTWARE CO., LTD., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 400 days.

(21) Appl. No.: 17/123,082

(22) Filed: Dec. 15, 2020

(65) Prior Publication Data

US 2021/0105599 A1    Apr. 8, 2021

Related U.S. Application Data

(63) Continuation of application No. PCT/CN2018/092155, filed on Jun. 21, 2018.

(51) Int. Cl.
*H04W 4/70* (2018.01)
*H04L 5/00* (2006.01)
(Continued)

(52) U.S. Cl.
CPC .......... *H04W 4/70* (2018.02); *H04L 5/0048* (2013.01); *H04W 4/06* (2013.01); *H04W 48/10* (2013.01); *H04W 72/04* (2013.01)

(58) Field of Classification Search
CPC ......... H04W 4/70; H04W 4/06; H04W 72/30; H04W 72/04; H04W 72/12; H04W 76/40;
(Continued)

(56) References Cited

U.S. PATENT DOCUMENTS

2012/0327894 A1   12/2012   Axmon et al.
2014/0357272 A1   12/2014   Axmon et al.
(Continued)

FOREIGN PATENT DOCUMENTS

CN       102316535 A     1/2012
CN       104604315 A     5/2015
(Continued)

OTHER PUBLICATIONS

International Search Report issued in PCT/CN2018/092155, dated Mar. 20, 2019 and English translation, (4p).
(Continued)

*Primary Examiner* — Ian N Moore
*Assistant Examiner* — Brian T Le
(74) *Attorney, Agent, or Firm* — Arch & Lake LLP

(57) ABSTRACT

Methods and devices for transmitting machine type communication (MTC) system information are provided. A base station determines the ability of an MTC apparatus to detect
(Continued)

information in a cell. The ability to detect information includes whether the MTC apparatus supports searching for default MTC system information in a target resource region. The base station may further map a target physical resource in a time-frequency region corresponding to the preset sub-frame according to the information detection ability and a preset resource mapping manner. The target physical resource is used to load the default MTC system information. The base station may also broadcast the preset MTC system information by the target physical resource.

19 Claims, 16 Drawing Sheets

(51) Int. Cl.
*H04W 4/06* (2009.01)
*H04W 48/10* (2009.01)
*H04W 72/04* (2023.01)

(58) Field of Classification Search
CPC ..... H04W 48/10; H04W 16/00; H04W 36/06; H04L 5/0048; H04L 5/00; H04L 1/0001; H04B 7/024
See application file for complete search history.

(56) References Cited

U.S. PATENT DOCUMENTS

| 2018/0034605 | A1 | 2/2018 | Fang et al. | |
| 2020/0221480 | A1* | 7/2020 | Li | H04W 74/0816 |
| 2021/0068075 | A1* | 3/2021 | Uesaka | H04L 1/08 |

FOREIGN PATENT DOCUMENTS

| CN | 104936183 A | 9/2015 |
| CN | 105122715 A | 12/2015 |
| CN | 106851545 A | 6/2017 |
| CN | 107196751 A | 9/2017 |
| CN | 107852257 A | 3/2018 |

OTHER PUBLICATIONS

First Office Action issued to Chinese Application No. 201880000954.9, dated Oct. 28, 2020 with English translation, (11p).
Ericsson, "New WID on Rel-16 MTC Enhancements For LTE" 3GPP TSG RAN Meeting #80, RP-181450, LaJolla, CA, Jun. 11-14, 2018, (4p).
Samsung, "Discussion on Use of Control Channel Region" 3GPP TSG RAN WG2 Meeting #94, R1-1808736, Gothenburg, Sweden, Aug. 20-24, 2018, (3p).
Xiaomi Communications, Initial Views on the Use of LTE Control Channel Region for DL Transmission, 3GPP TSG RAN WG1 Meeting #94, Gothenburg Sweden, Aug. 20, 24, 2018, (3p).

\* cited by examiner

ALLOCATING RESOURCES FOR TRANSMITTING MTC SYSTEM INFORMATION

CROSS-REFERENCE TO RELATED APPLICATIONS

This application is a continuation of PCT Application No. PCT/CN2018/092155, filed on Jun. 21, 2018, the entire contents of which are incorporated herein by reference in their entirety for all purposes.

TECHNICAL FIELD

The present disclosure relates to the field of communication technologies, and in particular, to a method and device for transmitting Machine Type Communication (MTC) system information, a base station, and a terminal.

BACKGROUND

Machine Type Communication (MTC) refers to communication between machines without human intervention, which is widely used in various fields, for example, smart cities, such as meter reading; smart agriculture, such as collection of information such as temperature and humidity; and smart transportation such as a shared bicycle. A traditional MTC physical downlink control channel (PDCCH) is deployed in a 4G Long Term Evolution (LTE) frequency spectrum and shares frequency resources and a part of channels with LTE users.

In the related art, a MTC system is dependent on deployment resources of a 4G LTE system, and in a time period such as 40 ms of LTE system broadcasts system information such as a master information block (MIB), a physical broadcast channel PBCH resource of the MTC system is not mapped in a control channel region of a preset sub-frame, that is, a corresponding region of first three Orthogonal Frequency Division Multiplexing (OFDM) symbols of one sub-frame, and at a position of a physical resource occupied by cell reference signal (CRS).

With a development of communication technologies, mobile communication networks are gradually evolving to 5G New Radio (NR) networks, and LTE systems will gradually withdraw from mobile cellular networks. At that time, spectrum resources of the LTE systems will be re-farmed into 5G NR spectrum resources. Due to a long-life cycle of the MTC system, which may last more than ten years, after the LTE systems exit the mobile cellular networks, the MTC system may still exist. Therefore, it is necessary to independently deploy the PBCH resources of the MTC system to carry system information of the MTC system such as MIB. If the PBCH resources of the MTC system are still deployed according to the related technologies, control channel resources of the original LTE system will be idle, resulting in a waste of resources.

SUMMARY

Embodiments of the present disclosure provide a method and device for transmitting Machine Type Communication (MTC) system information, a base station and a terminal.

According to a first aspect of the present disclosure, there is provided a method for transmitting MTC system information. In the method, a base station determines an information detection ability of an MTC apparatus in a cell. The information detection ability may include whether the MTC apparatus supports searching for preset MTC system information from a target resource region. A time region of the target resource region may be a time region of a control region of a preset sub-frame in an original LTE system. A frequency region may be a frequency resource region occupied by preset MTC system information in the original LTE system. The preset sub-frame may be a sub-frame that carries the preset MTC system information. The base station may also map a target physical resource in a time-frequency region corresponding to the preset sub-frame according to the information detection ability and a preset resource mapping manner. The target physical resource may be configured to carry the preset MTC system information. The base station may further broadcast the preset MTC system information by the target physical resource.

According to a second aspect of the present disclosure, a method for transmitting MTC system information is provided. In the method, a base station obtains the preset MTC system information for accessing a cell network from a data region of the preset sub-frame. The MTC apparatus may support searching for the preset MTC system information from a target resource region. A time region of the target resource region may be a time region of a control region of the preset sub-frame in an original long term evolution LTE system. A frequency region may be a frequency resource region occupied by preset MTC system information in the original LTE system. The preset sub-frame may be a sub-frame that carries the preset MTC system information. The base station may also access the cell network. A time region of the data region may be a time region excluding the control region in the preset sub-frame. A frequency region of the data region corresponds to a frequency resource region occupied by the preset MTC system information in the original LTE system. The base station may further obtain broadcast configuration information sent by a base station. The broadcast configuration information may be configured to inform the MTC apparatus of a mapping range of a target physical resource in the preset sub-frame. The target physical resource may be configured to carry the preset MTC system information. The base station may further detect the preset MTC system information in the preset sub-frame according to the broadcast configuration information.

According to a third aspect of the present disclosure, a computing device is provided. The computing device may include one or more processors, a non-transitory computer-readable memory storing instructions executable by the one or more processors. The one or more processors may be configured to determine information detection ability of a machine type communication MTC apparatus in a cell. The information detection ability represents whether the MTC apparatus supports searching for preset MTC system information from a target resource region. A time region of the target resource region may be a time region of a control region of a preset sub-frame in an original LTE system. A frequency region may be a frequency resource region occupied by preset MTC system information in the original LTE system. The preset sub-frame may be a sub-frame that carries the preset MTC system information. The one or more processors may also be configured to map a target physical resource in a time-frequency region corresponding to the preset sub-frame according to the information detection ability and a preset resource mapping manner. The target physical resource may be configured to carry the preset MTC system information. The one or more processors may further be configured to broadcast the preset MTC system information by the target physical resource.

It should be noted that the above general description and the following detailed description are merely examples and explanatory and should not be construed as limiting of the present disclosure.

BRIEF DESCRIPTION OF THE DRAWINGS

The accompanying drawings, which are incorporated in the specification and constitute a part of the specification, show embodiments of the present disclosure. The drawings along with the specification explain the principles of the present disclosure.

DETAILED DESCRIPTION

Figure 1A:
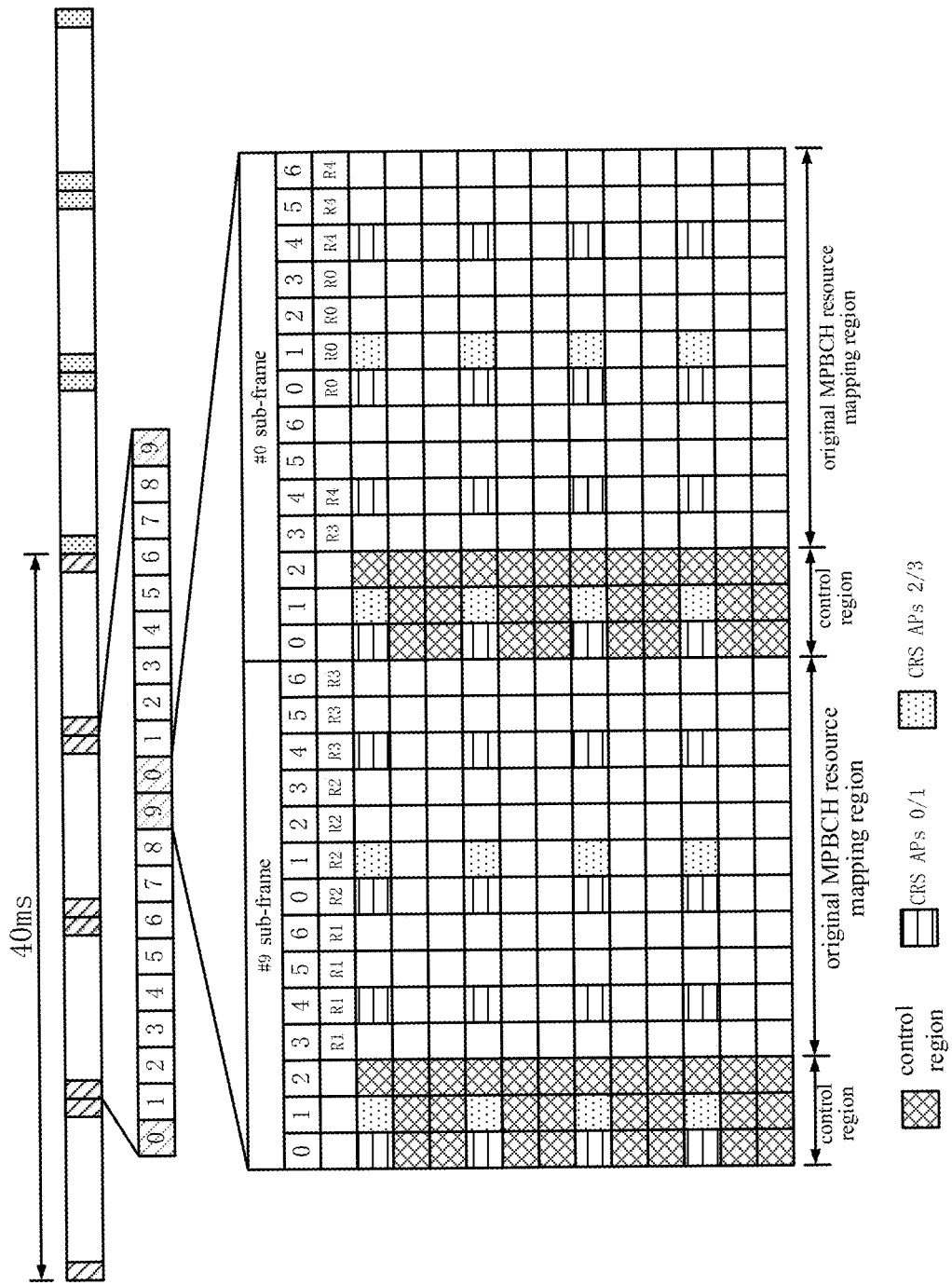
FIG. 1A is a schematic diagram showing a MPBCH resource mapping in MTC FDD normal CP mode in an LTE system, according to an example of the present disclosure.

A detailed description will now be made to embodiments, examples of which are illustrated in the accompanying drawings. The following description refers to the same or similar elements in the different figures unless otherwise indicated. The embodiments described in the following embodiments do not represent all embodiments consistent with the present disclosure. Instead, they are merely examples of devices and methods consistent with aspects of the present disclosure as detailed in the appended claims.

The terms used in the present disclosure are merely for the purpose of describing particular embodiments and are not intended to limit the present disclosure. As used in the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "upon" or "when" or "in response to determination."

Execution bodies involved in the present disclosure include: a base station and a terminal in a 5G network, where the base station may be a base station or a sub-base station provided with large-scale antenna arrays. The terminal can be an apparatus that transmits machine type communication services, which is referred to as a Machine Type Communication (MTC) apparatus, such as a smart meter, a shared bicycle, etc. In a specific implementation process, the base station and the terminal are independent and also communicate with each other to jointly implement the technical improvements provided by the present disclosure.

One or more application scenarios of the present disclosure includes: a MTC system that is not dependent on an original 4G LTE system and is deployed independently. For example, spectrum resources of the original 4G LTE system are re-farmed as spectrum resources of a 5G NR system.

In the original 4G LTE system, the MTC apparatus need to share the spectrum resources and channels with LTE users, that is, the MTC system is dependent on the original 4G LTE system. Due to a narrowband transmission characteristic of a MTC service, when the base station performs resource mapping for the MTC system, it does not map physical resources in an existing control region, that is, a time-frequency region corresponding to first three OFDM symbols of one sub-frame, and map the physical resources for the MTC system in a data region of the sub-frame, that is, a time-frequency region corresponding to last 11 OFDM symbols.

Correspondingly, when the base station performs physical broadcast channel (PBCH) resource mapping in a preset sub-frame for the MTC system, it also does not map MTC PBCH (MPBCH) resources in a control region of the preset sub-frame. In the present disclosure, the PBCH resources of the MTC system are referred to as the MPBCH resources. The preset sub-frame includes: a 0th sub-frame and a 9th sub-frame in a MTC Frequency Division Duplexing (FDD) system; and a 0th and a 5th sub-frame in a MTC Time Division Duplexing (TDD) system. The MPBCH resource is configured to carry basic system information of the MTC system, such as a master information block (MIB).

For example, refer to FIG. 1A which shows a schematic diagram of MPBCH resource mapping in a MTC FDD normal CP mode in the LTE system, in the MTC system dependent on the original LTE system, when the system adopts the MTC FDD normal CP mode for information transmission, the base station may repeat broadcast preset MTC system information such as MIB information by the MPBCH resource deployed in the 0th sub-frame and the 9th sub-frame in a broadcast cycle with a time period of 40 ms. In the FIG. 1A, R0 represents a first broadcast in one broadcast cycle; R1, R2, R3, R4 represent a first, second, third and fourth repetition broadcast, respectively. PSS/SSS represent primary and secondary synchronization signals, respectively. A full name of PSS is primary synchronization signal, and a full name of SSS is secondary synchronization signal.

Figure 1B:
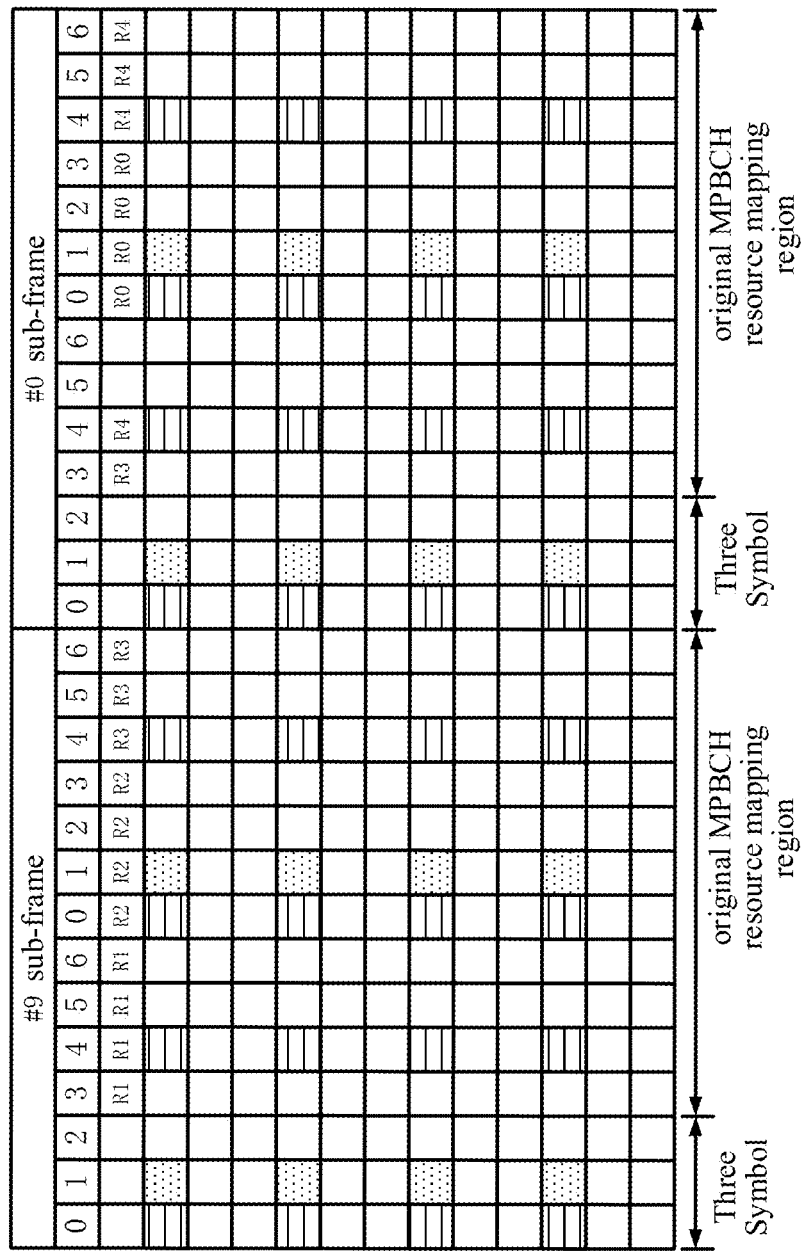
FIG. 1B is a schematic diagram showing a scenario of transmitting MTC system information, according to an example of the present disclosure.

After the LTE system exits a mobile cellular network, the control region of the preset sub-frame in the original LTE system, that is, the time-frequency region corresponding to the first three OFDM symbols, will be vacated and become a blank resource. As in the above example, after the LTE system exits the mobile cellular network, the control regions of the 0th and 9th sub-frames shown in FIG. 1A will be vacated and become blank resources, as shown in FIG. 1B.

Based on this, embodiments of the present disclosure provide a method for transmitting MTC system information. When the base station independently deploys the MPBCH resources for the MTC system, the control region resources of the preset sub-frames in the original LTE system can be used to transmit the preset system information such as the MIB information for improving the transmission efficiency of the MTC system information.

Figure 2:
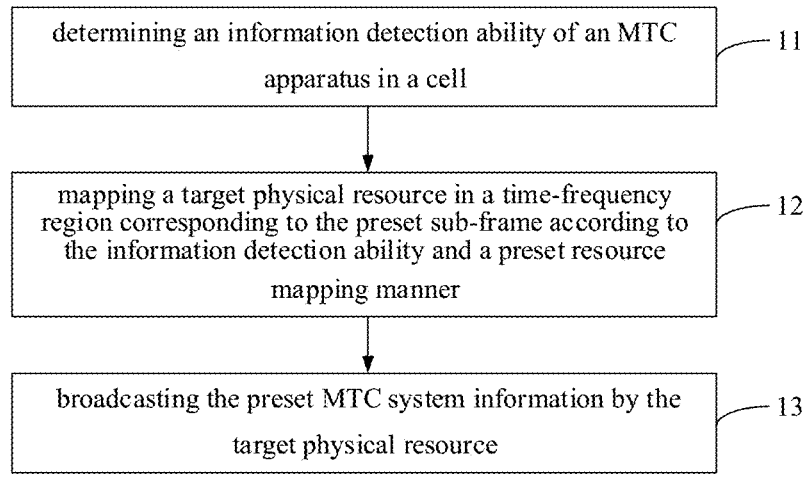
FIG. 2 is a flowchart showing a method for transmitting MTC system information, according to an example of the present disclosure.

Refer to FIG. 2, which is a flowchart showing a method for transmitting MTC system information according to an embodiment, which is applied in the base station, and the method may include steps 11-13.

In step 11, an information detection ability of a MTC apparatus to in a cell is determined.

The information detection ability of the MTC apparatus represents whether the MTC apparatus supports searching for the preset MTC system information such as the MIB information in a target resource region.

A time-frequency range of the target resource region is equal to a time region corresponding to the control region of the preset sub-frame of the original LTE system in a time domain; and equal to a frequency resource region occupied by the preset MTC system information in the original LTE system in a frequency domain. The preset MTC system information includes: information required for the MTC apparatus to access the cell of the base station, such as MIB information. After receiving the preset MTC system information sent by the base station, the MTC apparatus can access the cell covered by the base station.

Correspondingly, a frequency region of the target resource region may be a frequency resource region occupied by a mapping region of the MPBCH resource in the original LTE system.

The MTC FDD normal CP mode is still taken as an example, and the mapping region of the MPBCH resource in the original LTE system is a time-frequency region occupied by the data regions of preset 6 PRB pairs in the 0th and 9th sub-frames. A data region of one sub-frame refers to a time-frequency region corresponding to the last 11 OFDM symbols of one sub-frame. A time-frequency range of one physical resource block (PRB) is one slot in the time domain, that is, 0.5 ms, where one slot includes 7 OFDM symbols; and includes 12 consecutive sub-carriers in the frequency domain, and if a frequency interval of one sub-carrier is 15 KHz, a frequency range of one PRB is 180 KHz.

One PRB pair occupies 2 slots in the time domain, that is, 1 ms; and includes 12 sub-carriers in the frequency domain.

The present disclosure relates to two types of MTC apparatuses, one type of the MTC apparatus does not support searching for the preset MTC system information from the target resource region, which may be referred to as a first type of MTC apparatus in the present disclosure. The first MTC apparatus may be an MTC apparatus that uses transmission protocols of the original LTE system, such as an existing Rel.13-Rel.15 terminal. Another type of the MTC apparatus may support searching for the preset MTC system information from the target resource region, which may be referred to as a second type of MTC apparatus in the present disclosure.

Regarding how the base station determines the information detection ability of the MTC apparatus, in one or more embodiments, the base station may determine the information detection ability of individual MTC apparatuses in a current cell.

For example, the base station learns that an operator in the cell only deploys release 13 MTC apparatuses based on operator deployment information obtained in advance, and can determine that all of the MTC apparatuses in the current cell belong to the first type of the MTC apparatus.

In another embodiment of the present disclosure, after the MTC apparatus accesses the cell of the base station, the base station may also determine the information detection ability of individual MTC apparatuses by means of apparatus ability information reported by the MTC apparatus.

Figure 3:
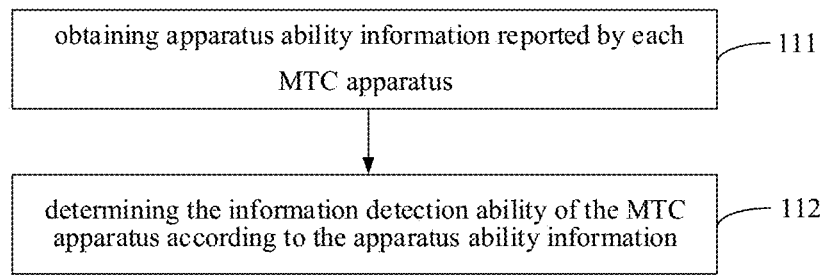
FIG. 3 is a flowchart showing another method for transmitting MTC system information, according to an example of the present disclosure.

Referring to FIG. 3, which is a flowchart showing another method for transmitting MTC system information according to an embodiment, the step 11 may include steps 111 and 112.

In step 111, the apparatus ability information reported by each of the MTC apparatuses is obtained;

In the present disclosure, after the MTC apparatus accesses the cell, for example, after the MTC apparatus accesses the cell network for the first time, the base station may request the MTC apparatus accessing the cell network to report the apparatus ability information, that is, the MTC apparatus passively reports the apparatus ability information. Alternatively, the MTC apparatus actively reports the apparatus ability information to the base station under a preset trigger condition, such as when accessing the cell network covered by the base station. The apparatus ability information includes at least: information indicating the information detection ability of the MTC apparatus.

In step 112, the information detection ability of the MTC apparatus is determined according to the apparatus ability information.

In some embodiments of the present disclosure, the apparatus ability information may include: a preset indication value configured to indicate the information detection ability. In this case, the step 112 is specifically: determining the information detection ability of the MTC apparatus according to the preset indication value.

In some embodiments, the first indication value may be used to indicate that the MTC apparatus belongs to the first type of MTC apparatus; the second indication value is used to indicate that the MTC apparatus belongs to the second type of MTC apparatus.

Assuming that the protocol specifies that one bit in a designated field carrying the apparatus ability information is used to indicate the information detection ability of the MTC apparatus. For example, the first indication value is 0, and the second indication value is 1.

A specific implementation process of the step 112 is: if the base station detects that a preset bit in the apparatus ability information reported by the MTC apparatus, such as UE1, is set to 0, it is determined that UE1 does not support searching for the preset MTC system information from the target resource region. That is, it is determined that UE1 belongs to the first type of MTC apparatus. Conversely, if the preset bit is set to 1, it is determined that UE1 supports searching for the preset MTC system information in the target resource region. That is, it is determined that UE1 belongs to the second type of MTC apparatus.

In step 12, a target physical resource is mapped in a time-frequency region corresponding to the preset sub-frame according to the information detection ability and a preset resource mapping manner, and the target physical resource is configured to carry the preset MTC system information.

In the present disclosure, the target physical resource is a resource that carries the preset MTC system information. If the preset MTC system information is the MIB information of the MTC system, the target physical resource is the PBCH resource of the MTC system, referred to as the MPBCH resource for short. The following example takes the target physical resource as the MPBCH resource as an example for detailed description.

According to different abilities to detect information of individual MTC apparatuses in the cell, the base station can adopt the following two mapping manners to map the MPBCH resource in the time-frequency region corresponding to the preset sub-frame:

a first mapping manner is consistent with the original LTE system, and the MPBCH resource is mapped in an original MPBCH resource mapping region. The original MPBCH resource mapping region can be seen in FIG. 1A;

a second mapping manner is to map the MPBCH resource in an effective region of the preset sub-frame, where the effective region refers to a region excluding CRS resources in the preset sub-frame. The effective region includes: the time-frequency region corresponding to the first three OFDM symbols of the original LTE system and the original MPBCH resource mapping region, as shown in FIG. 1B, and the MPBCH resource is mapped in blanks shown in FIG. 1B.

In the present disclosure, the base station can map the CRS resource in the preset sub-frame with reference to the original LTE system, referring to the deployment of CRS APs 0/1 and CRS APs 2/3 in FIG. 1B.

Regarding the mapping of the target physical resource, according to whether the apparatus types of individual MTC apparatuses in the cell are consistent, the implementation of the step 12e may include two cases:

In a first case, at least one MTC apparatus in the cell does not support searching for the preset MTC system information from the target resource region, that is, there is at least one MTC apparatus of the first type in the cell.

In this case, the base station maps the MPBCH resource in the data region of the preset sub-frame according to the first mapping manner. A time region of the data region corresponds to a time region excluding the control region in the preset sub-frame, and a frequency region of the data region corresponds to a frequency resource region occupied by the preset MTC system information in the original LTE system.

Figure 4A:
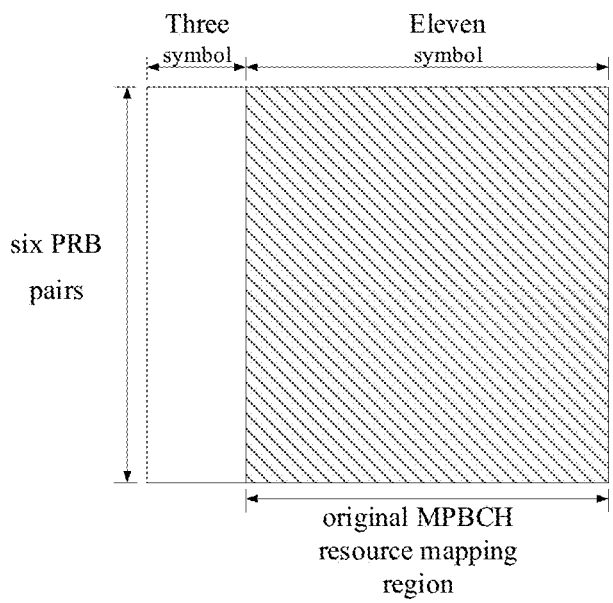
FIG. 4A is a schematic diagram showing another application scenario for transmitting MTC system information, according to an example of the present disclosure.

Referring to FIG. 4A, which is a schematic diagram of the MPBCH resource mapping region of the preset sub-frame according to an embodiment, the MPBCH resource mapping region of one preset sub-frame includes: a time-frequency region corresponding to the last 11 OFDM symbols of the preset 6 PRB pairs in the time-frequency region corresponding to one preset sub-frame, that is, the original MPBCH resource mapping region.

In a second case 2, all of the MTC apparatuses in the cell support searching for the preset MTC system information from the target resource region, that is, all of the MTC apparatuses in the cell belong to the second type of MTC apparatus.

In this case, the base station may use the second mapping manner to map the MPBCH resource in the preset sub-frame by default, or the base station independently decides which mapping manner to use to map the MPBCH resource in the preset sub-frame.

Figure 5:
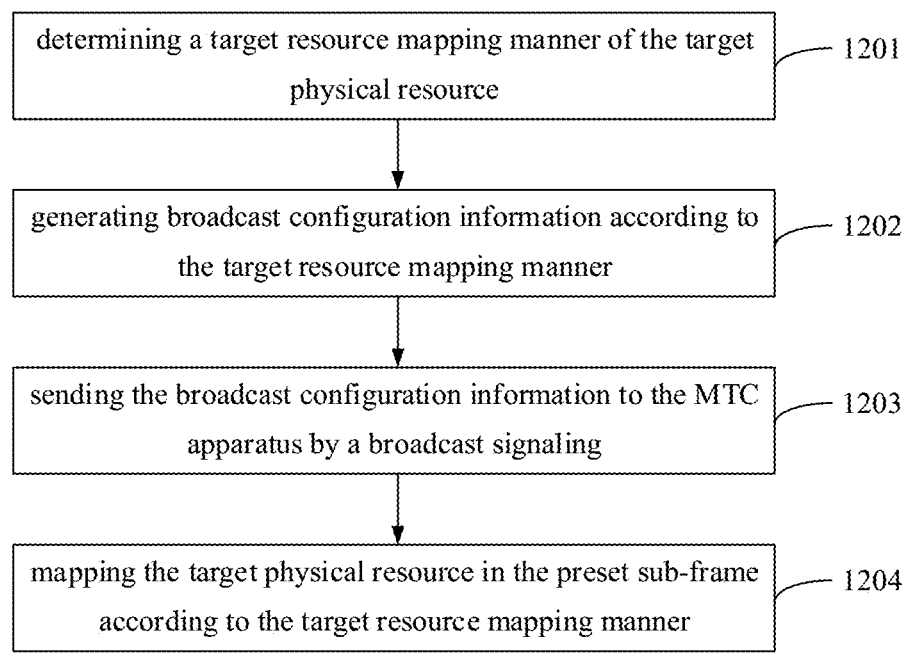
FIG. 5 is a flowchart showing another method for transmitting MTC system information, according to an example of the present disclosure.

For the case where the base station independently determines the mapping manner, referring to FIG. 5, which is a flowchart showing another method for transmitting MTC system information according to an embodiment, the step 12 may include:

in step 1201, a target resource mapping manner of the target physical resource is determined;

in the embodiments of the present disclosure, if the base station determines that all of the MTC apparatuses in the cell belong to the second type of MTC apparatus, it can independently determine whether to use the first mapping manner or the second mapping manner to map the MPBCH resource in the preset sub-frame according to requirements such as configuration flexibility.

In step 1202, broadcast configuration information is generated according to the target resource mapping manner, where the broadcast configuration information is configured to inform the MTC apparatus of a mapping range of the target physical resource in the preset sub-frame;

In some embodiments of the present disclosure, after independently determining the target resource mapping manner, the base station may also generate the broadcast configuration information according to the target resource mapping manner to inform the MTC apparatus in the cell of the mapping range of the MPBCH resource.

In one or more embodiments, the broadcast configuration information may include: the target resource mapping manner, such as the first mapping manner.

In another embodiment of the present disclosure, the broadcast configuration information may also include: a specific mapping range of the MPBCH resource, such as the last 11 OFDM symbols.

In step 1203, the broadcast configuration information is sent to the MTC apparatus by a broadcast signaling;

In the present disclosure, the base station can broadcast the broadcast configuration information to individual MTC apparatuses in the cell by the broadcast signaling, so that individual MTC apparatuses can accurately locate a target search region when obtaining the preset MTC system information.

In some embodiments, the broadcast configuration information may be carried by one bit set in the main information block MIB. For example, when the one bit is set to 0, it indicates the first mapping manner; in country, when the one bit is set to 1, it indicates the second mapping manner.

In another embodiment of the present disclosure, after the MTC apparatus accesses the cell network, the base station can also carry the broadcast configuration information by one bit in System Information Block (SIB), and broadcast the broadcast configuration information to inform the MTC apparatus.

In some embodiments of the present disclosure, for the above second case, that is, all of the MTC apparatuses in the cell of the base station support searching for the preset MTC system information from the target resource region, the base station can independently decide which resource mapping manner to use for the MPBCH resource mapping according to flexibility requirements, and generate the broadcast configuration information and broadcast it to each MTC apparatus, so that when the MTC apparatus detects the preset MTC system information, it can accurately locate the target search region according to the broadcast configuration information, improving the efficiency of the MTC apparatus to detect the preset MTC system information such as MIB, thereby improving the efficiency of the MTC apparatus accessing the cell of the base station.

In step 1204, the target physical resource is mapped in the preset sub-frame according to the target resource mapping manner.

According to different target resource mapping manners, the implementation of the step 1204 may include:

a first manner, in which the target physical resource is mapped according to the first mapping manner, which is same as the above first case, thus details are omitted here.

a second manner, in which the target physical resource is mapped according to the second mapping manner in the time-frequency region corresponding to the preset sub-frame.

Figure 4B:
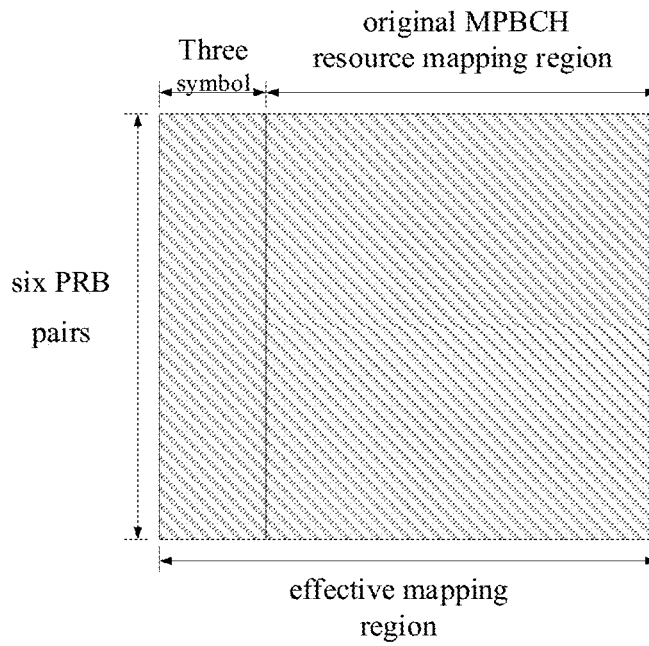
FIG. 4B is a schematic diagram showing another application scenario for transmitting MTC system information, according to an example of the present disclosure.

When the base station maps the MPBCH resource in the preset sub-frame according to the second mapping manner, an available effective mapping region includes: the target resource region and the original MPBCH resource mapping region, the time-frequency region occupied by 6 PRB pairs in the preset sub-frame as shown in FIG. 4B.

In the present disclosure, for the case where the base station maps the MPBCH resource according to the second mapping manner, the base station can determine how to map the target physical resources based on different MTC transmission modes and different types of MPBCH unit resources that need to be deployed in the original MPBCH resource mapping region.

In the related art, the MTC system can use the following four MTC transmission modes for information transmission, which are machine type communication frequency division duplex normal cyclic prefix MTC FDD Normal CP mode; machine type communication frequency division duplex extended cyclic prefix MTC FDD Extended CP mode; machine type communication time division duplex normal cyclic prefix MTC TDD Normal CP mode; and machine type communication time division duplex extended cyclic prefix MTC TDD Extended CP mode, respectively.

In each of the MTC transmission modes, the base station deploys four PBCH unit resources in the original MPBCH resource mapping region of the preset sub-frame, which are PBCH symbol 1, PBCH symbol 2, PBCH symbol 3, and PBCH symbol 4, respectively. In different MTC transmission modes, the mapping manners of the four PBCH unit resources are also different, as shown in FIG. 6A, FIG. 7, FIG. 8, and FIG. 9.

Figure 10:
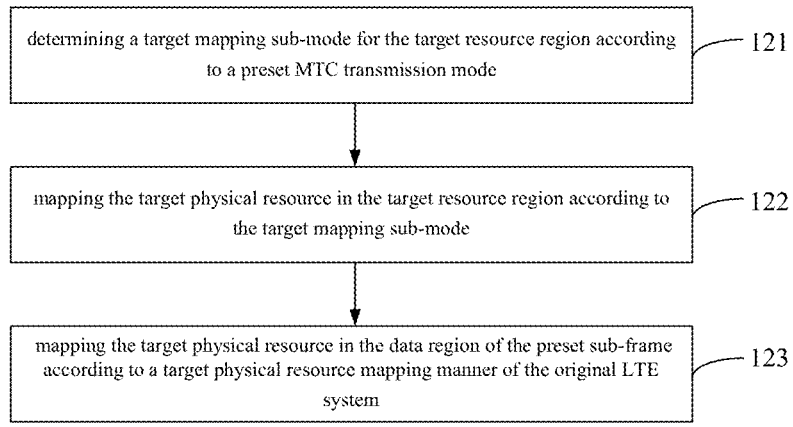
FIG. 10 is a flowchart showing another method for transmitting MTC system information, according to an example of the present disclosure.

Based on this, referring to FIG. 10, which is a flowchart showing another method for transmitting MTC system information according to an embodiment, the step 12 may include:

In step 121, a target mapping sub-manner for the target resource region is determined according to a preset MTC transmission mode;

The target mapping sub-manner is configured to indicate how to map the target physical resource such as the MPBCH resource in the target resource region.

In the present disclosure, at least the following two manners can be used to implement the step 121:

a first implementation is to determine the target mapping sub-manner according to provisions of the protocol.

In the present disclosure, a 5G NR protocol can preset a corresponding mapping sub-manner for each of the preset MTC transmission modes. After determining the MTC transmission mode adopted by the current cell, the base station can determine the corresponding target mapping sub-manner.

In one or more embodiments, the base station may query a preset resource mapping list according to the MTC transmission mode of the current cell, and determine the target mapping sub-manner corresponding to the MTC transmission mode. The preset resource mapping list includes: a correspondence between the MTC transmission mode and the preset mapping sub-manner, and the preset mapping sub-manner is configured to indicate how to map the PBCH symbol in the target resource region. The preset resource mapping list may be as shown in Table 1:

TABLE 1

| MTC transmission mode | preset sub-frame | | |
|---|---|---|---|
| | #0 sub-frame (S0、S1、S2) | #5 sub-frame (S0、S1、S2) | #9 sub-frame (S0、S1、S2) |
| FDD Normal CP | 1、2、3 | Null | 1、2、4 |
| FDD Extended CP | 1、2、3 | Null | 4、2、1 |
| TDD Normal CP | 1、2、3 | 1、2、3 | Null |
| TDD Extended P | 1、2、3 | 4、2、3 | Null |

In the present disclosure, one target resource region includes three sub-regions. Each of the sub-regions is equal to a time period occupied by one symbol in the time domain; and equal to a frequency range occupied by 72 consecutive sub-carriers in the frequency domain, that is, the frequency range occupied by 6 PRB pairs. Corresponding to the three symbols in the target resource region, the three sub-regions can be represented as S0, S1, and S2, respectively.

Assuming that the base station determines that the MTC transmission mode of the current cell is MTC FDD Normal CP mode, as can be known by querying the Table 1, the corresponding target mapping sub-manner is as follows: mapping PBCH symbol 1, PBCH symbol 2 and PBCH symbol 3 in sequence in the time-frequency region corresponding to the first three OFDM symbols in the #0 sub-frame, that is, the sub-regions S0, S1, and S2; mapping PBCH symbol 1, PBCH symbol 2, PBCH symbol 3 and PBCH Symbol 4 in sequence in the sub-regions S0, S1, and S2 of #9 sub-frame. The above target mapping sub-manner can be simply expressed as: (#0: 1, 2, 3; #9 : 1, 2, 4).

In this way, when the MTC apparatus determines the MTC transmission mode used by the base station and the second mapping manner, according to the provisions of the protocol, the deployment of the MPBCH symbols in the target resource region by the base station can be clarified without the need for the base station to inform the target mapping sub-manner by a special signaling, thereby saving signaling overhead.

In a second implementation, the base station may dynamically determine the target mapping sub-manner for the preset MTC transmission mode, that is, for the same MTC transmission mode, the target mapping sub-manners determined by the base station at different times may be different.

Figure 11:
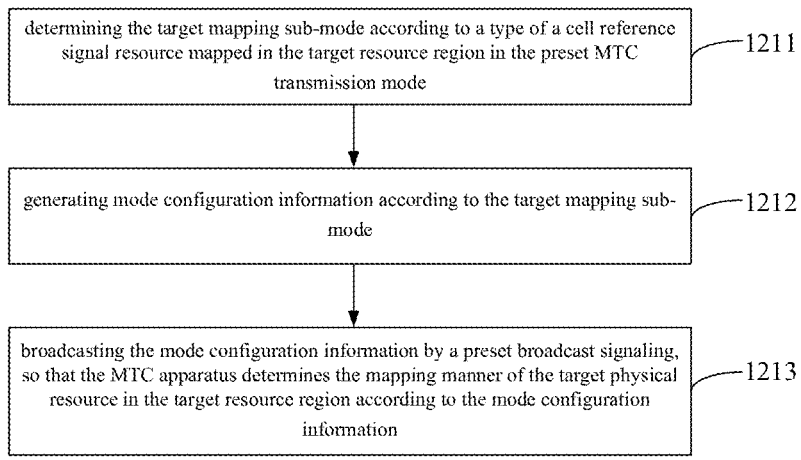
FIG. 11 is a flowchart showing another method for transmitting MTC system information, according to an example of the present disclosure.

Referring to FIG. 11, which is a flowchart showing another method for transmitting MTC system information according to an embodiment, the step 121 may include:

In step 1211, the target mapping sub-manner is determined according to a type of the cell reference signal resource mapped in the target resource region in the preset MTC transmission mode.

In the present disclosure, for any of the MTC transmission modes, the base station can map the CRS resource in the target resource region of the preset sub-frame according to the related technologies of the original LTE system; and determine the mapping manner of the target physical resource in the effective region of the target resource region according to the type of the CRS resource mapped in the target resource region and a relationship between a type of the PBCH symbol and a type of the CRS resource. The effective region of the target resource region refers to a region excluding the CRS resource in the target resource region. The type of the CRS resource includes: CRS APs 0/1 and CRS APs 2/3, where APs represents antenna ports logically, and in a downlink, the antenna port has a one-to-one correspondence with the CRS.

Before the target physical resource is mapped, the above three sub-regions can be divided into a first sub-region and a second sub-region according to whether the CRS resource is set in a sub-region of the target resource region. The first sub-region is provided with the CRS resource, including: sub-regions S0 and S1; the second sub-region is not provided with the CRS resource, that is, the sub-region S2, as shown in FIG. 4B.

In the present disclosure, how to determine the MPBCH resource mapping manner of the sub-region may include:

determining a sub-region type of a sub-region to be mapped;

determining a type of a MPBCH resource to be mapped according to the type of the CRS resource mapped in the sub-region and a resource mapping situation of the target sub-region in the original MPBCH resource mapping region, if the sub-region to be mapped belongs to the first sub-region, where same type of CRS resources are deployed in the above target sub-region.

Figure 6A:
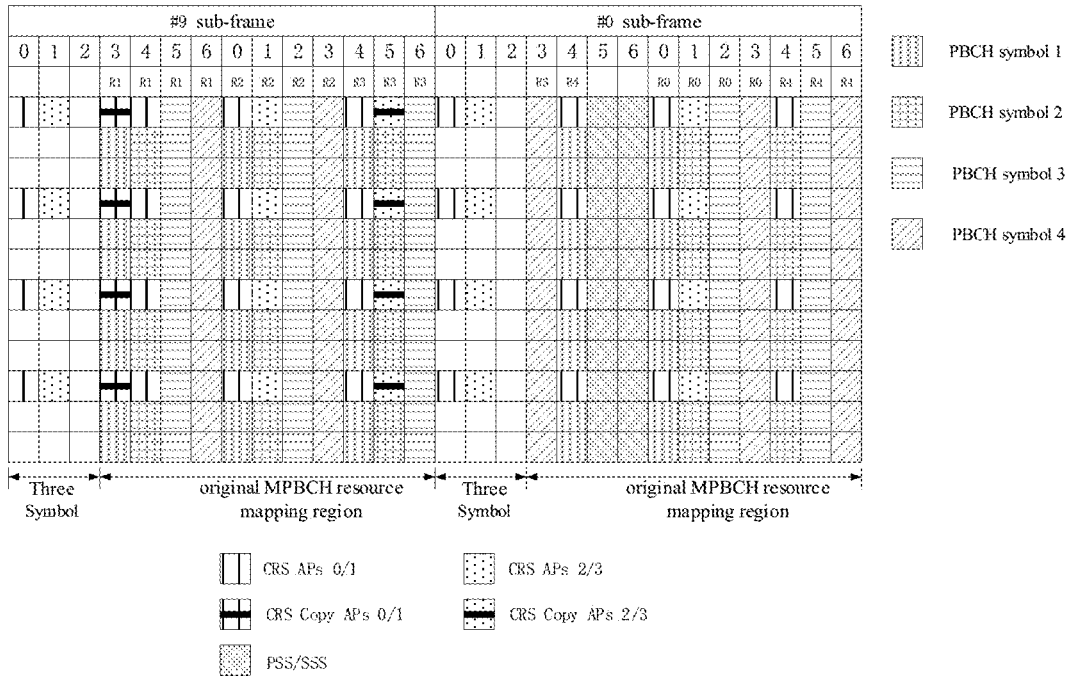
FIG. 6A is a schematic diagram showing another scenario for transmitting MTC system information, according to an example of the present disclosure.

As shown in FIG. 6A, the type of the CRS resource mapped in the sub-region S0 of the 9th sub-frame is: CRS APs 0/1; then the type of the MPBCH resource to be mapped can be referred to the MPBCH symbol mapped in the sub-region where #4 symbol of a first slot, #0 symbol of a second slot, and #4 symbol of the second slot are located, including: PBCH symbol 2, PBCH symbol 1.

If the current sub-region to be mapped belongs to the second sub-region, namely S2, any type of the MPBCH symbol can be mapped in this sub-region.

According to the above rules and with referring to FIG. 6A, FIG. 7, FIG. 8, and FIG. 9, the resource mapping sub-manners corresponding to the above four MTC transmission modes can be as shown in Table 2:

TABLE 2

| | FDD | | | | TDD | | | |
|---|---|---|---|---|---|---|---|---|
| | Normal CP | | Extended CP | | Normal CP | | Extended CP | |
| | #0 sub-frame | #9 sub-frame | #0 sub-frame | #9 sub-frame | #0 sub-frame | #5 sub-frame | #0 sub-frame | #5 sub-frame |
| | S0: 1、2<br>S1: 2<br>S2: 1、2、3、4 | S0: 1、2<br>S1: 2<br>S2: 1、2、3、4 | S0: 1、2、4<br>S1: 2<br>S2: 1、2、3、4 | S0: 1、4<br>S1: 2<br>S2: 1、2、3、4 | S0: 1、2<br>S1: 2<br>S2: 1、2、3、4 | S0: 1、2<br>S1: 2<br>S2: 1、2、3、4 | S0: 1、4<br>S1: 2<br>S2: 1、2、3、4 | S0: 1、4<br>S1: 2<br>S2: 1、2、3、4 |

The base station may determine any mapping sub-manner as the target mapping sub-manner according to the Table 2.

Assuming that the MTC transmission mode of the current cell is MTC FDD Normal CP mode, according to the Table 2, it can be known that mapping sub-manners that the base station can adopt include 16, as shown in Table 3:

TABLE 3

MTC FDD Normal CP

| mapping sub-manner | #0 sub-frame | #9 sub-frame |
|---|---|---|
| Mode one | (1、2、3) | (1、2、3) |
| Mode two | (1、2、3) | (1、2、4) |
| Mode three | (1、2、4) | (1、2、3) |
| Mode four | (1、2、4) | (1、2、4) |
| ...... | ...... | ...... |
| Mode sixteen | (1、2、2) | (1、2、1) |

The base station may determine any of the above modes as the target mapping sub-manner, such as mode two (1, 2, 3), (1, 2, 4).

In step 1212, mode configuration information is generated according to the target mapping sub-manner.

After determining the target sub-mapping manner, the base station can generate the mode configuration information according to information of the target mapping sub-manner to inform the MTC apparatus of the above target mapping sub-manner.

In the present disclosure, the mode configuration information may include specific MPBCH symbol types. For example, assuming that the target mapping sub-manner is the above-mentioned mode two, the mode configuration information may include: (1, 2, 3), (1, 2, 4).

In another embodiment of the present disclosure, a preset number of bits may also be used to represent the target mapping sub-manner. As in the above example, 4 bits can be used to represent the 16 mapping sub-manners corresponding to the MTC FDD Normal CP mode. For example, when the above 4 bits are set to 0000, it represents the mode one in Table 3 above. In this case, the mode configuration information may include: a number of bits representing the target mapping sub-manner. By using this bitmap manner to represent the target mapping sub-manner, signaling overhead can be saved.

In step 1213, the mode configuration information is broadcast by a preset broadcast signaling, so that the MTC apparatus determines the mapping manner of the target physical resource in the target resource region according to the mode configuration information.

Similarly, to the above, the base station can carry the mode configuration information by the broadcast signaling and broadcast it to the MTC apparatus.

In the present disclosure, the base station can dynamically determine the mapping manner of the MPBCH resource in the target resource region in the preset sub-frame at different times according to flexibility requirements, and before the MTC apparatus searches for the MTC system information, the mode configuration information is broadcast to the MTC apparatus to ensure that the MTC apparatus can accurately demodulate the preset MTC system information such as the MIB information from the preset sub-frame.

In step 122, the target physical resource is mapped in the target resource region according to the target mapping sub-manner.

Figure 6B:
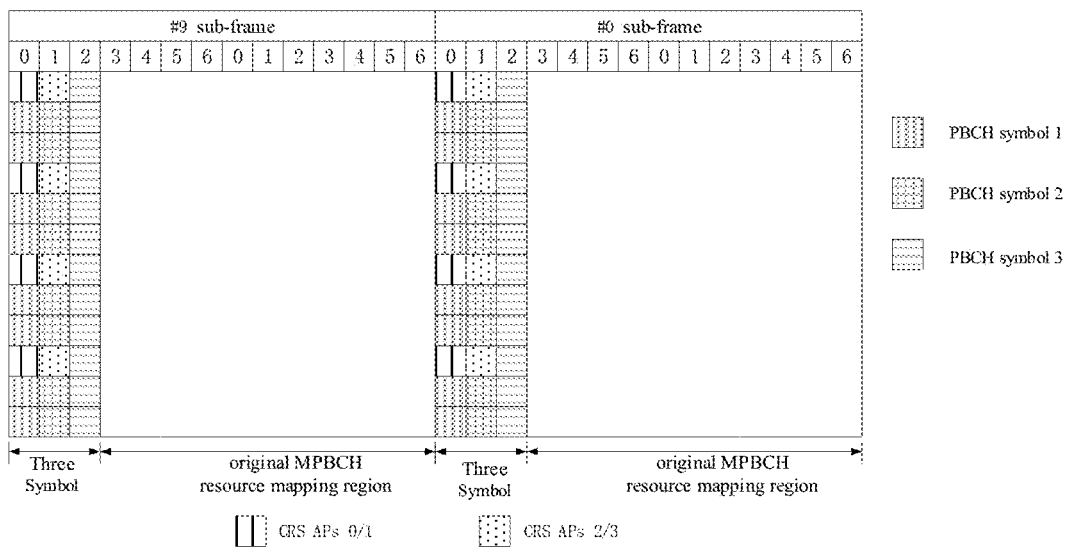
FIG. 6B is a schematic diagram showing another scenario for transmitting MTC system information, according to an example of the present disclosure.

The MTC transmission mode as the MTC FDD Normal CP mode is still taken as an example, and if the target mapping sub-manner determined in the step 121 is the mode 1 in Table 3 above, the base station maps PBCH symbol 1, PBCH symbol 2, and PBCH symbol 3 in the sub-regions S0, S1, and S2 in the target resource regions corresponding to the 0th and 9th sub-frames, respectively, as shown in FIG. 6B which is a schematic diagram of the base station mapping the target physical resource according to the second mapping manner.

Figure 6C:
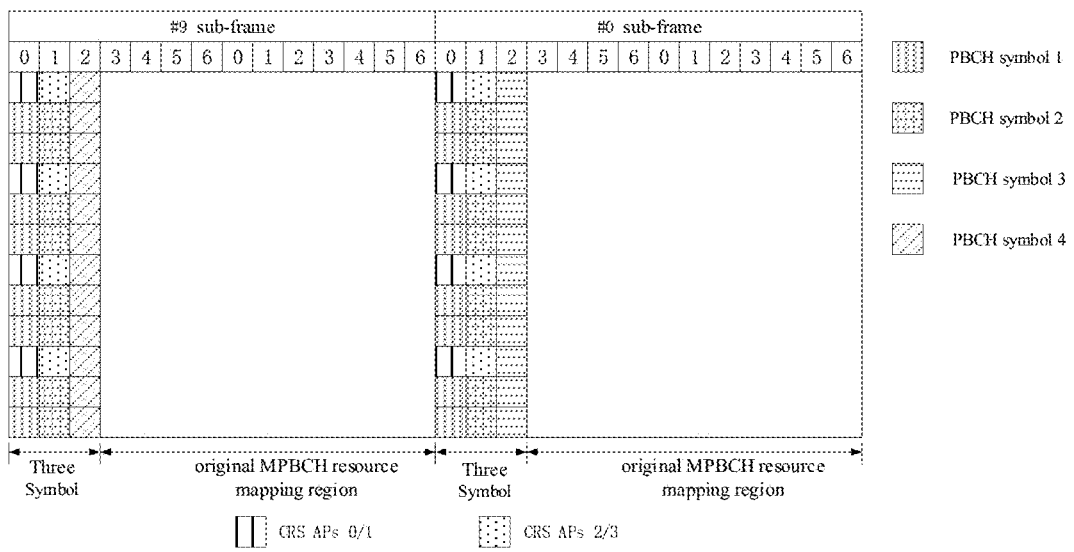
FIG. 6C is a schematic diagram showing another scenario for transmitting MTC system information, according to an example of the present disclosure.

Similarly, FIG. 6C shows a schematic diagram of MPBCH resource mapping in the target resource region when the target mapping sub-manner is the above-mentioned mode two. As shown in the figure, PBCH symbol 1, PBCH symbol 2, and PBCH symbol 3 are mapped in the sub-regions S0, S1, and S2 of the 0th sub-frame, respectively, and PBCH symbol 1, PBCH symbol 2, and PBCH symbol 4 are mapped in the sub-regions S0, S1, S2 of the 9th sub-frame, respectively.

Figure 6D:
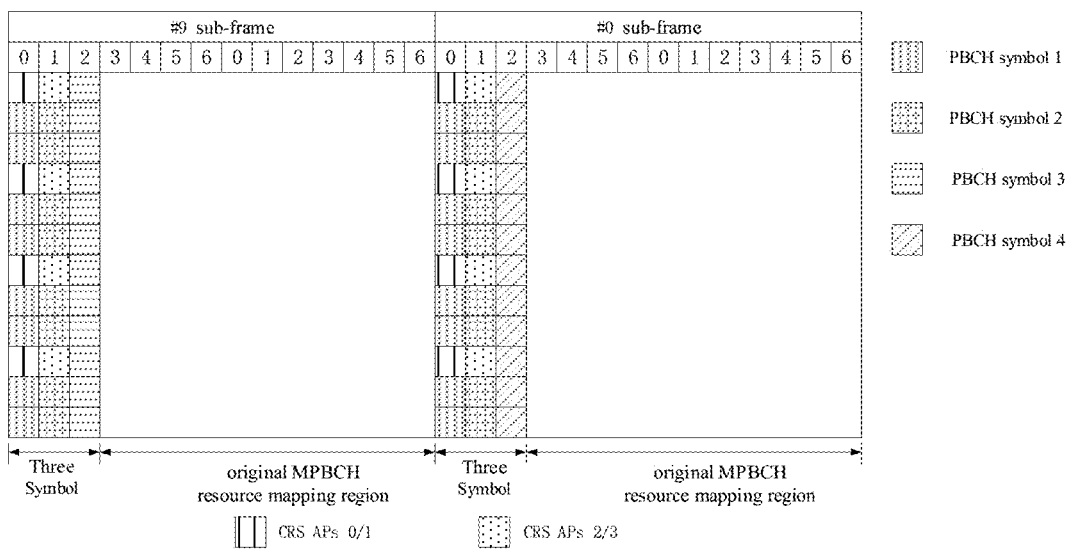
FIG. 6D is a schematic diagram showing another scenario for transmitting MTC system information, according to an example of the present disclosure.

FIG. 6D shows a schematic diagram of MPBCH resource mapping in the target resource region when the target mapping sub-manner is the above mode three. As shown in the figure, PBCH symbol 1, PBCH symbol 2, and PBCH symbol 4 are mapped in the sub-regions S0, S1, and S2 of the 0th sub-frame, respectively, and PBCH symbol 1, PBCH symbol 2, and PBCH symbol 3 are mapped in the sub-regions S0, S1, S2 of the 9th sub-frame, respectively.

Figure 6E:
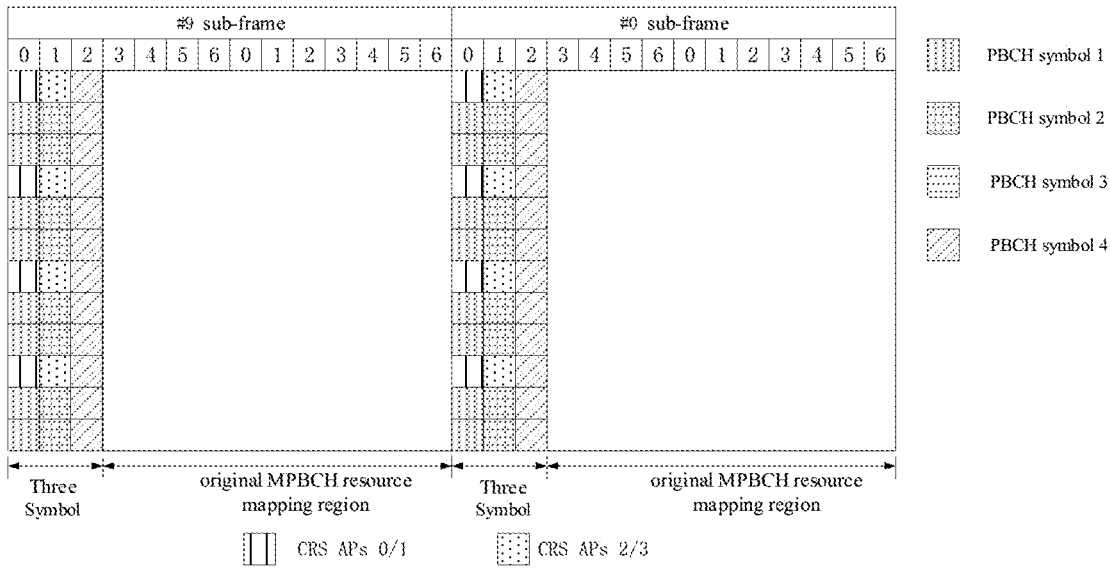
FIG. 6E is a schematic diagram showing another scenario for transmitting MTC system information, according to an example of the present disclosure.

FIG. 6E shows a schematic diagram of MPBCH resource mapping in the target resource region when the target mapping sub-manner is the above mode four. As shown in the figure, PBCH symbol 1, PBCH symbol 2, and PBCH symbol 4 are mapped in the sub-regions S0, S1, and S2 of the 0th sub-frame, respectively, and PBCH symbol 1, PBCH symbol 2, and PBCH symbol 4 are mapped in the sub-regions S0, S1, S2 of the 9th sub-frame, respectively.

In the present disclosure, when the target physical resource is mapped for the second sub-region, that is, sub-region S2, if the type of the resource to be mapped indicated by the target mapping sub-manner is provided with a preset CRS resource in a matching manner in the original MPBCH resource mapping region, when the base station performs the resource mapping for the second sub-region according to the target mapping sub-manner, in addition to mapping the MPBCH symbols to be mapped, the base station also needs to map the same type of CRS resources at the same time.

The MTC transmission mode as the MTC FDD Normal CP mode is still taken as an example, if the target mapping sub-manner determined in the step 121 is the mode sixteen in Table 3 above, it can be seen that the types of the resources to be mapped in the sub-region S2 of the 0th sub-frame and the 9th sub-frame are PBCH symbol 2 and PBCH symbol 1, respectively, both of which are provided with respective CRS resources in the original MPBCH resource mapping region, as shown in FIG. 6A. For example, in the original MPBCH resource mapping region of the 0th sub-frame, PBCH symbol 2 and CRS APs 0/1 or CRS APs 2/3 are bounded during mapping, and in the original MPBCH resource mapping region of the 9th sub-frame, PBCH symbol 1 and CRS APs 0/1 are bounded during mapping. In this case, when the base station performs resource mapping in the sub-region S2 of the target resource region according to the above mode sixteen, the same type of CRS resources are required to be deployed.

Figure 6F:
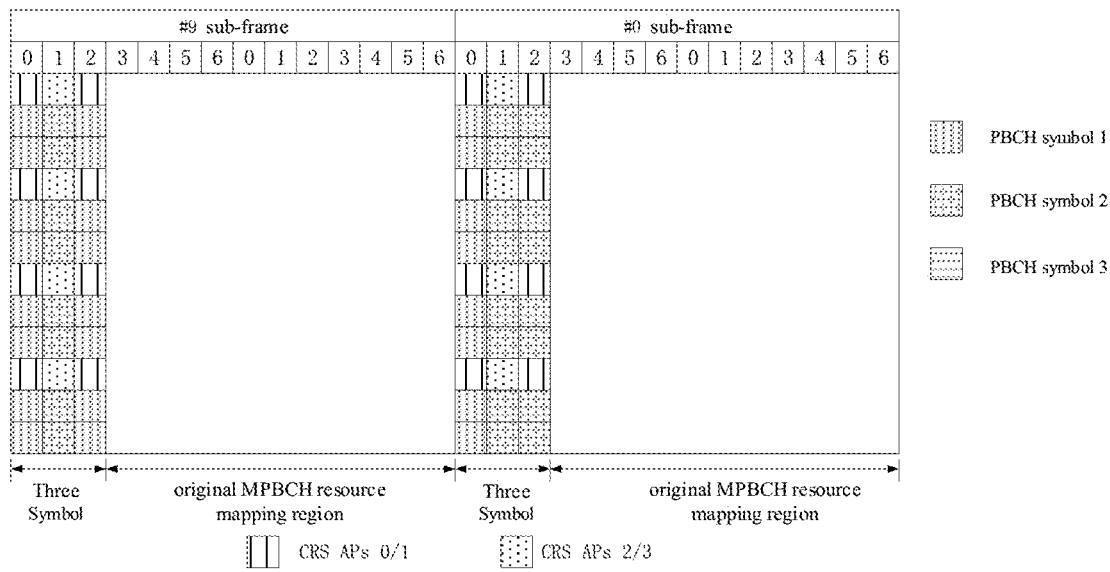
FIG. 6F is a schematic diagram showing another scenario for transmitting MTC system information, according to an example of the present disclosure.

Referring to a schematic diagram of MPBCH resource mapping in the target resource region when the target mapping sub-manner is the above-mentioned mode sixteen as shown in FIGS. 6F, and as shown in the figure, in sub-regions S0, S1, and S2 of the 0th sub-frame, PBCH symbol 1, PBCH symbol 2, and PBCH symbol 2 are mapped respectively, and at the same time CRS APs 0/1 are also mapped in the sub-region S2; similarly, in the sub-regions S0, S1, and S2 of the 9th sub-frame, PBCH symbol 1, PBCH symbol 2, and PBCH symbol 1 are mapped, respectively, and at the same time CRS APs 0/1 are also mapped in the sub-region S2.

It should be noted here that, in another embodiment of the present disclosure, CRS APs 2/3 matching with PBCH symbol 2 can also be mapped in the sub-region S2 of the 0th sub-frame.

Similarly, the resource mapping manner of the target region in other MTC transmission modes is similar to the above-mentioned MTC FDD Normal CP mode, so please refer to the relevant parts, and the details are not repeated here.

In step 123, the target physical resource is mapped in the data region of the preset sub-frame according to the target physical resource mapping manner of the original LTE system.

Figure 6G:
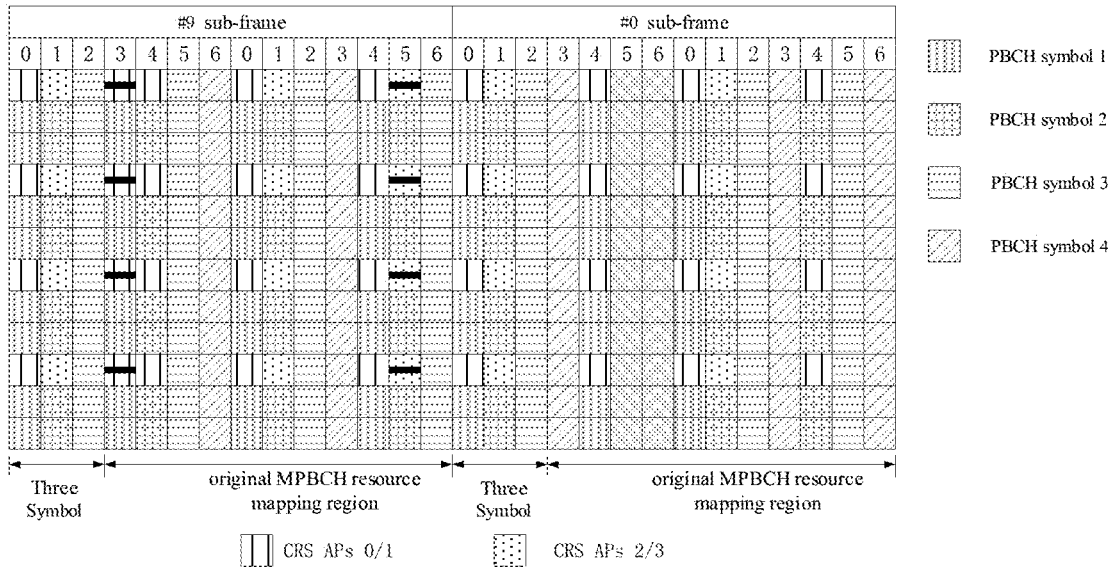
FIG. 6G is a schematic diagram showing another scenario for transmitting MTC system information, according to an example of the present disclosure.
Figure 7:
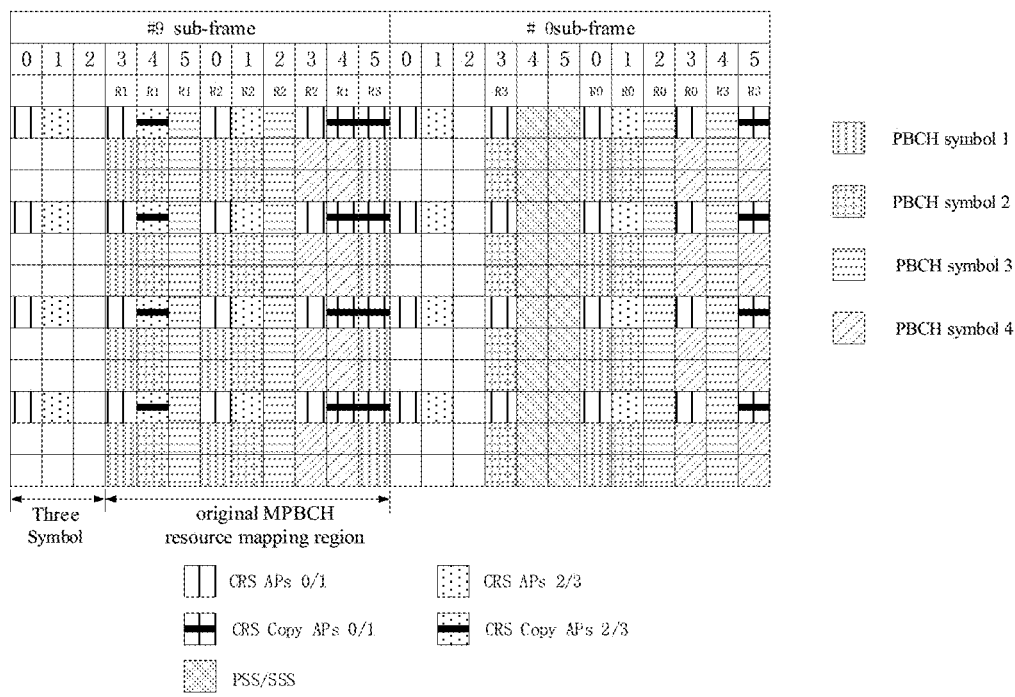
FIG. 7 is a schematic diagram showing a MPBCH resource mapping in MTC FDD Extended CP mode in an LTE system, according to an example of the present disclosure.
Figure 8:
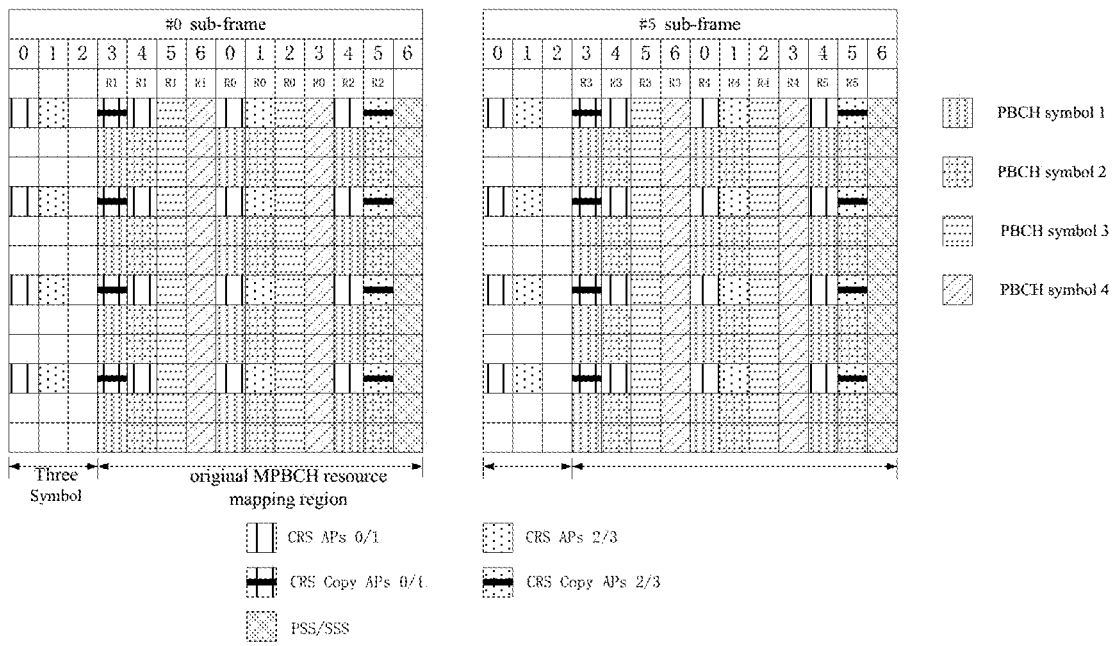
FIG. 8 is a schematic diagram showing a MPBCH resource mapping in MTC TDD Normal CP mode in an LTE system, according to an example of the present disclosure.
Figure 9:
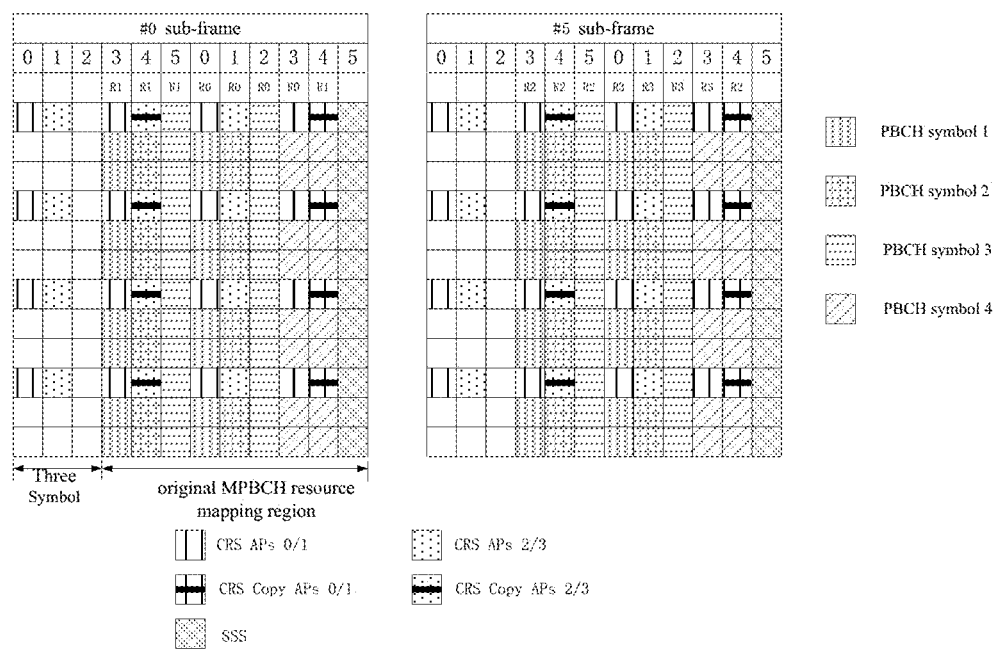
FIG. 9 is a schematic diagram showing a MPBCH resource mapping in MTC TDD Extended CP mode in an LTE system, according to an example of the present disclosure.

In the present disclosure, the resource deployment in the original MPBCH resource mapping region by the base station may be the same as the original LTE system. It should be noted that there is no precedence between the step 123 and the step 122, which can be performed simultaneously. Corresponding to the FIG. 6B, the resource mapping situations of the 0th and 9th sub-frames in the MTC FDD Normal CP mode is shown in FIG. 6G.

In step 13, the preset MTC system information is broadcast by the target physical resource.

After mapping the target physical resource, the base station may load the MTC system information such as the MIB information into the target physical resource and broadcast it to the MTC apparatus in the cell, so that the MTC apparatus can obtain the preset MTC system information from the preset sub-frame, and access the cell network according to the preset MTC system information.

In summary, in the method for transmitting MTC system information provided by the present disclosure, in an application scenario where the system independently deploys the physical broadcast channel resource for the MTC apparatus, if the MTC apparatus supports detecting the preset MTC system information such as MIB from the target resource region of the preset sub-frame, that is, the control region of the preset sub-frame of the original LTE system, the base station may map the target physical resource (that is, the PBCH resource) configured to carry the preset MTC system information in the target resource region of the preset sub-frame when performing the physical broadcast resource mapping, thereby enhancing the mapping range of the PBCH resource, improving the utilization of system resources, and further improving the transmission efficiency of MTC system information.

Figure 12:
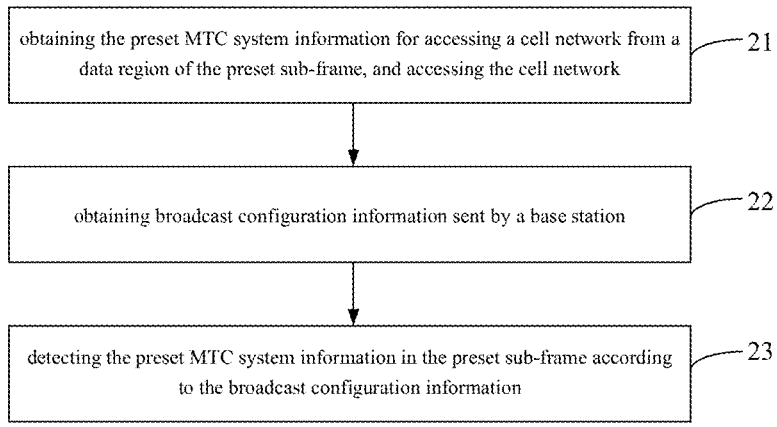
FIG. 12 is a flowchart showing a method for transmitting MTC system information, according to an example of the present disclosure.

Correspondingly, the present disclosure also provides a method for transmitting MTC system information, which is applied to the above-mentioned second MTC apparatus, that is, a MTC apparatus that supports searching for the preset MTC system information from the target resource region. The time region of the target resource region is the time region of the control region of the preset sub-frame in the original LTE system, and is the time region corresponding to the first three OFDM symbols of the preset sub-frame, as shown in FIG. 1A; and the frequency region is the frequency resource region occupied by the preset MTC system information such as the MIB information Referring to FIG. 12, which is a flowchart showing a method for transmitting MTC system information according to an embodiment, the method may include:

in step 21, the preset MTC system information for accessing a cell network is obtained from a data region of the preset sub-frame, and the cell network is accessed; a time region of the data region is a time region excluding the control region in the preset sub-frame, and a frequency region of the data region corresponds to a frequency resource region occupied by the preset MTC system information in the original LTE system.

In the present disclosure, when the MTC apparatus initially accesses the cell network, it still obtains the preset MTC system information such as the MIB information according to related technologies, and accesses the MTC network system of the cell.

In step 22, broadcast configuration information sent by a base station is obtained, and the broadcast configuration information is configured to inform the MTC apparatus of a mapping range of a target physical resource in the preset sub-frame, and the target physical resource is configured to carry the preset MTC system information.

In an application scenario where the MTC apparatus has accessed to the cell network and needs to obtain the preset MTC system information again, for example, when the MTC apparatus needs a system update, or when the MTC apparatus changes from an idle state to an active state, it can receive the broadcast configuration information broadcast by the base station to determine the mapping range of the target physical resources such as the MPBCH resource. Description can be referred to that of the step 1202 and the step 1203.

In step 23, the preset MTC system information is detected in the preset sub-frame according to the broadcast configuration information.

Corresponding to the above step 1202 and step 1203, an implementation of the step 23 includes two cases:

a first case, in which if the broadcast configuration information indicates that the mapping manner of the target physical resource is the first mapping manner, the MTC apparatus still detects the preset MTC system information in the original MPBCH resource mapping region corresponding to the preset sub-frame according to the related technologies, as shown in FIG. 4A; and a second case, in which if the broadcast configuration information indicates that the mapping manner of the target physical resource is the second mapping manner, the step 23 is specifically: the MTC apparatus detects the preset MTC system information in the effective mapping region of the preset sub-frame, as shown in FIG. 4B.

For the second case above, the MTC apparatus can detect the preset MTC system information in the effective mapping region of the preset sub-frame in any of the following ways.

Figure 13:
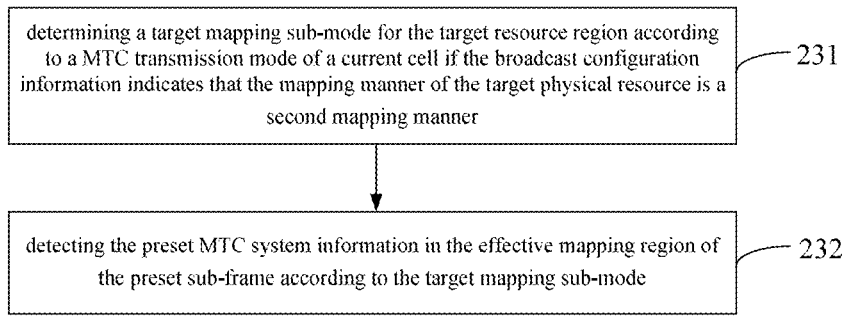
FIG. 13 is a flowchart showing another method for transmitting MTC system information, according to an example of the present disclosure.

Referring to FIG. 13 which is a flowchart showing a method for transmitting MTC system information according to an embodiment, the step 23 may include:

in step 231, a target mapping sub-manner for the target resource region is determined according to a MTC transmission mode of the current cell if the broadcast configuration information indicates that the mapping manner of the target physical resource is the second mapping manner.

That is, if the broadcast configuration information indicates that the base station maps the target physical resource in the target resource region according to the second mapping manner, the MTC apparatus needs to first determine the resource mapping manner of each sub-region in the target resource region, that is, the target mapping sub-manner.

In the present disclosure, the MTC apparatus can determine the target mapping sub-manner in any of the following ways:

a first manner, in which the MTC apparatus detects the MTC system information according to the resource mapping manner specified by the provisions of the protocol, which corresponds to the first implementation of the step 121.

That is, the step 231 is specifically: querying a preset resource mapping list according to the MTC transmission mode of the current cell, and determining the target mapping sub-manner corresponding to the MTC transmission mode, and the preset resource mapping list includes: a correspondence between the MTC transmission mode and a preset mapping sub-manner, and the preset mapping sub-manner is configured to indicate how to map a physical broadcast channel PBCH symbol in the target resource region by the base station.

The preset resource mapping list is shown in Table 1.

In the present disclosure, after determining the MTC transmission mode adopted by the base station, the MTC apparatus can clarify the target mapping sub-manner adopted by the base station when deploying the MPBCH symbols in the target resource region according to the preset resource mapping list.

A second manner: corresponding to the second implementation of step 121, in which the MTC apparatus determines the target mapping sub-manner according to the mode configuration information sent by the base station.

Figure 14:
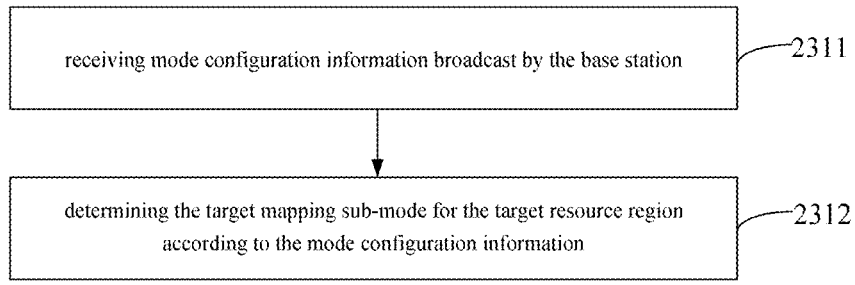
FIG. 14 is a flowchart showing another method for transmitting MTC system information, according to an example of the present disclosure.

Referring to FIG. 14, which is a flowchart showing a method for transmitting MTC system information according to an embodiment, the step 231 may include:

in step 2311, mode configuration information broadcast by the base station is received; and in step 2312, the target mapping sub-manner for the target resource region is determined according to the mode configuration information.

In some embodiments of the present disclosure, the MTC apparatus can determine which mapping manner to use by the base station to deploy the MPBCH symbols in the target resource region of the preset sub-frame, so that the MTC apparatuses subsequently can accurately analyze the preset MTC system information.

In step 232, the preset MTC system information is detected in the effective mapping region of the preset sub-frame according to the target mapping sub-manner.

After determining the target mapping sub-manner, the MTC apparatus demodulates part of the preset MTC system information in the target resource region of the effective mapping region according to the target mapping sub-manner; and demodulates the other part of the preset MTC system information according to related technologies in the original MPBCH resource mapping region of the above effective mapping region.

Figure 15:
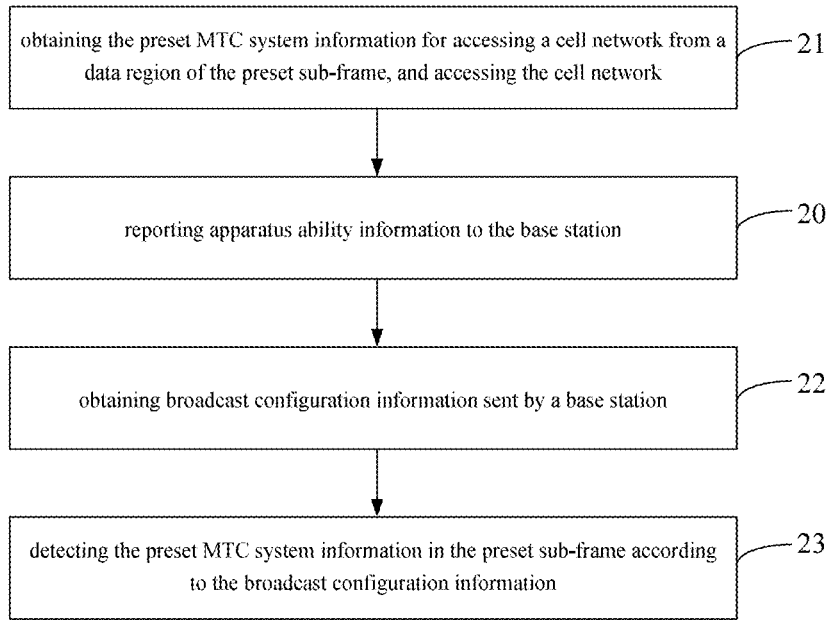
FIG. 15 is a flowchart showing another method for transmitting MTC system information, according to an example of the present disclosure.

Referring to FIG. 15, which is a flowchart showing a method for transmitting MTC system information according to an embodiment, before the step 22, the method may further include:

In step 20, apparatus ability information is reported to the base station, and the apparatus ability information is configured to indicate whether the MTC apparatus has an ability of searching for the preset MTC system information from the target resource region, so that the base station determines an information detection ability of the MTC apparatus.

In some embodiments of the present disclosure, after accessing the cell network, the MTC apparatus can also report its own ability information to the base station, so that the base station can determine the information detection ability of the MTC apparatus, which corresponds to the embodiment shown in FIG. 3 above, and details are repeated here.

When the MTC apparatus demodulates the preset MTC system information carried by the MPBCH resource, it needs to perform power accumulation on each symbol of the PBCH over a long period of time and try to demodulate. Therefore, in a fixed time, the more MPBCH resources are deployed and transmitted, the more PBCH receiving power is accumulated by the MTC apparatus, and the larger probability of successfully demodulating the preset MTC system information. Therefore, in the method for transmitting MTC system information provided by the present disclosure, when the base station uses the second mapping manner to map the target physical resource in the preset sub-frame, the system resources can be effectively used and the demodulation efficiency of the preset MTC system information can be improved.

For the foregoing method embodiments, for the sake of simple description, they are all expressed as a series of action combinations, but those skilled in the art should know that the present disclosure is not limited by the described sequence of actions, since according to the present disclosure, certain steps may be performed in other orders or simultaneously.

Secondly, those skilled in the art should also be aware that the embodiments described in the specification are optional embodiments, and the actions and modules involved are not necessarily required by the present disclosure.

Corresponding to the foregoing application function realization method embodiments, the present disclosure also provides embodiments of application function realization devices and corresponding terminals.

Figure 16:
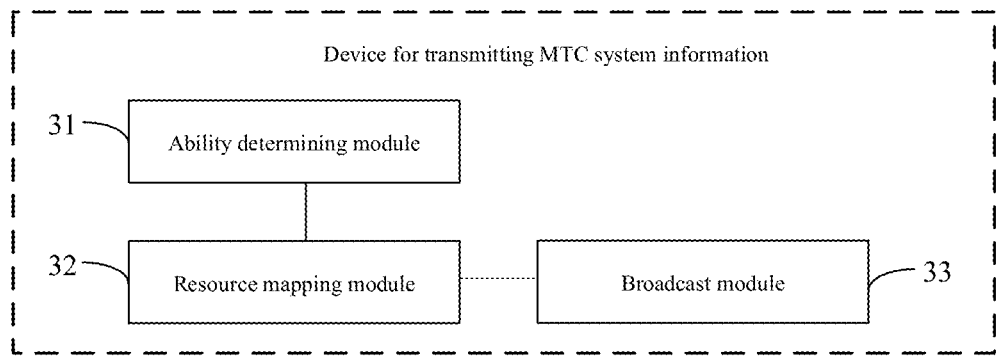
FIG. 16 is a block diagram showing a device for transmitting MTC system information, according to an example of the present disclosure.

Correspondingly, the present disclosure provides a device for transmitting MTC system information, which is provided in a base station. Referring to FIG. 16, which is a block diagram showing a device for transmitting MTC system information according to an embodiment, the device may include:

an ability determining module 31, configured to determine information detection ability of a machine type communication MTC apparatus in a cell, wherein the information detection ability represents whether the MTC apparatus supports searching for preset MTC system information from a target resource region, a time region of the target resource region is a time region of a control region of a preset sub-frame in an original LTE system, a frequency region is a frequency resource region occupied by preset MTC system information in the original LTE system, and the preset sub-frame is a sub-frame that carries the preset MTC system information;

In a device embodiment of the present disclosure, the preset MTC system information includes: a master information block MIB of the MTC system;

the control region of the preset sub-frame includes: a time region corresponding to first three OFDM symbols of the preset sub-frame and a frequency resource region corresponding to the master information block MIB of the MTC system.

A resource mapping module 32 is configured to map a target physical resource in a time-frequency region corresponding to the preset sub-frame according to the information detection ability and a preset resource mapping manner, wherein the target physical resource is configured to carry the preset MTC system information;

the preset resource mapping manner may include:

a first mapping manner, configured to map the target physical resource to a data region of the preset sub-frame, wherein a time region of the data region corresponds to a time region excluding the control region in the preset sub-frame, and a frequency region of the data region corresponds to a frequency resource region occupied by the preset MTC system information in the original LTE system; or, a second mapping manner, configured to map the target physical resource to an effective mapping region of the preset sub-frame, wherein the effective mapping region of the preset sub-frame is a time-frequency region excluding a cell reference signal resource in the preset sub-frame.

A broadcast module 33 is configured to broadcast the preset MTC system information by the target physical resource.

Figure 17:
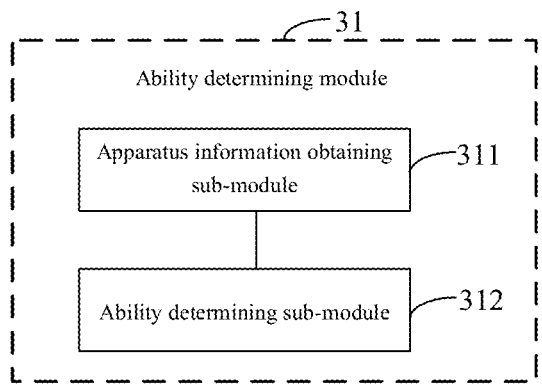
FIG. 17 is a block diagram showing another device for transmitting MTC system information, according to an example of the present disclosure.

Referring to FIG. 17, which is a block diagram showing another device for transmitting MTC system information according to an embodiment, based on the device embodiment shown in FIG. 16, the ability determining module 31 may include:

an apparatus information obtaining sub-module 311, configured to obtain apparatus ability information reported by each MTC apparatus; and an ability determining sub-module 312, configured to determine the information detection ability of the MTC apparatus according to the apparatus ability information.

Figure 18:
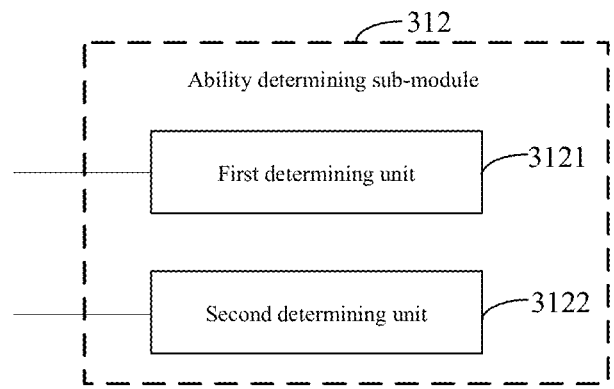
FIG. 18 is a block diagram showing another device for transmitting MTC system information, according to an example of the present disclosure.

In a device embodiment of the present disclosure, the apparatus ability information may include: a preset indication value for indicating the information detection ability; referring to FIG. 18, which is a block diagram showing another device for transmitting MTC system information according to an embodiment, based on the device embodiment shown in FIG. 17, the ability determining sub-module 312 may include:

a first determining unit 3121, configured to determine that the MTC apparatus supports searching for the preset MTC system information in the target resource region in a case where the preset indication value is a first indication value; and a second determining unit 3122, configured to determine that the MTC apparatus does not support searching for the preset MTC system information in the target resource region in a case where the preset indication value is a second indication value.

Figure 19:
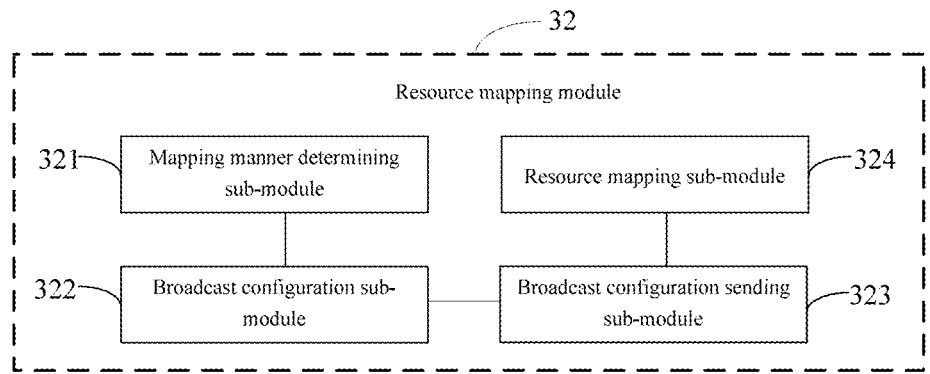
FIG. 19 is a block diagram showing another device for transmitting MTC system information, according to an example of the present disclosure.

Referring to FIG. 19, which is a block diagram showing another device for transmitting MTC system information according to an embodiment, based on the device embodiment shown in FIG. 16, the resource mapping module 32 may include:

a mapping manner determining sub-module 321, configured to determine a target resource mapping manner of the target physical resource, wherein the target resource mapping manner is the first mapping manner or the second mapping manner;

a broadcast configuration sub-module 322, configured to generate broadcast configuration information according to the target resource mapping manner, wherein the broadcast configuration information is configured to inform the MTC apparatus of a mapping range of the target physical resource in the preset sub-frame;

a broadcast configuration sending sub-module 323, configured to send the broadcast configuration information to the MTC apparatus by a broadcast signaling; and a resource mapping sub-module 324, configured to map the target physical resource in the time-frequency region corresponding to the preset sub-frame according to the target resource mapping manner.

In a device embodiment of the present disclosure, the resource mapping module 32 may include:

a first mapping sub-module, configured to map the target physical resource in the preset sub-frame according to the first mapping manner in a case where the MTC apparatus does not support searching for the preset MTC system information from the target resource region.

In another device embodiment of the present disclosure, the resource mapping module 32 may include:

a second mapping sub-module, configured to map the target physical resource in the preset sub-frame according to the second mapping manner in a case where the MTC apparatus supports searching for the preset MTC system information from the target resource region.

Figure 20:
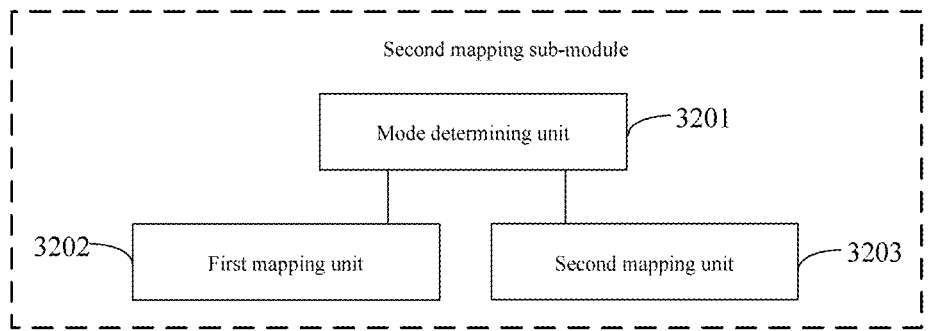
FIG. 20 is a block diagram showing another device for transmitting MTC system information, according to an example of the present disclosure.

Referring to FIG. 20, which is a block diagram showing another device for transmitting MTC system information according to an embodiment, the second mapping sub-module may include:

a mode determining unit 3201, configured to determine a target mapping sub-manner for the target resource region according to a preset MTC transmission mode, wherein the target mapping sub-manner is configured to indicate how to map the target physical resource in the target resource region;

in a device embodiment of the present disclosure, the mode determining unit 3201 may be configured to query a preset resource mapping list according to a MTC transmission mode of a current cell, and determine the target mapping sub-manner corresponding to the MTC transmission mode, wherein the preset resource mapping list includes: a correspondence between the MTC transmission mode and a preset mapping sub-manner.

A first mapping unit 3202 is configured to map the target physical resource in the target resource region according to the target mapping sub-manner; and a second mapping unit 3203 is configured to map the target physical resource in the data region of the preset sub-frame according to a target physical resource mapping manner of the original LTE system.

Figure 21:
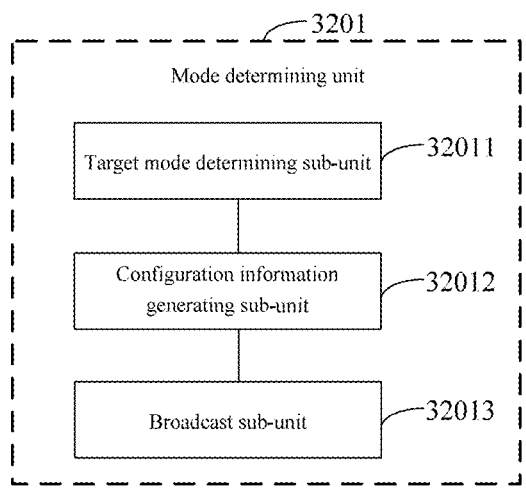
FIG. 21 is a block diagram showing another device for transmitting MTC system information, according to an example of the present disclosure.

Referring to FIG. 21, which is a block diagram showing another device for transmitting MTC system information according to an embodiment, based on the device embodiment shown in FIG. 20, the mode determining unit 3201 may include:

a target mode determining sub-unit 32011, configured to determine the target mapping sub-manner according to a type of a cell reference signal resource mapped in the target resource region in the preset MTC transmission mode;

a configuration information generating sub-unit 32012, configured to generate mode configuration information according to the target mapping sub-manner; and a broadcast sub-unit 32013, configured to broadcast the mode configuration information by a preset broadcast signaling, so that the MTC apparatus determines the mapping manner of the target physical resource in the target resource region according to the mode configuration information.

Figure 22:
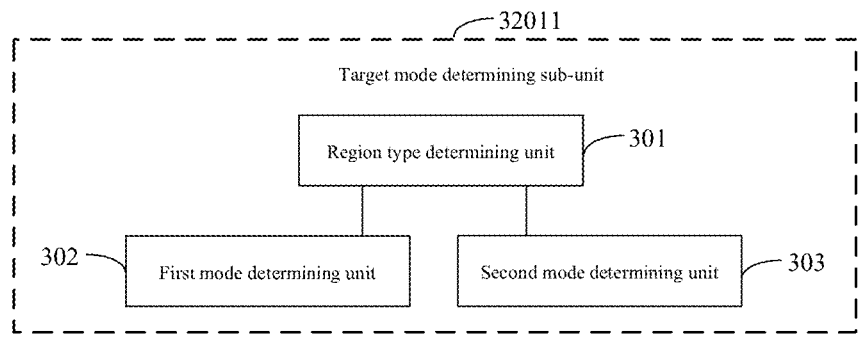
FIG. 22 is a block diagram showing another device for transmitting MTC system information, according to an example of the present disclosure.

Referring to FIG. 22, which is a block diagram showing another device for transmitting MTC system information according to an embodiment, based on the device embodiment shown in FIG. 21, the target mode determining sub-unit 32011 may include:

a region type determining unit 301, configured to determine a sub-region type of a sub-region to be mapped, wherein the sub-region type includes: a first sub-region and a second sub-region, and the first sub-region is mapped with the CRS resource, and the second sub-region is not mapped with the CRS resource;

a first mode determining unit 302, configured to determine a type of a MPBCH symbol to be mapped according to a type of the CRS resource of the sub-region to be mapped and a resource mapping manner of an original MPBCH resource mapping region in a case where the sub-region to be mapped belongs to the first sub-region; and a second mode determining unit 303, configured to determine any type of MPBCH symbol as a MPBCH symbol to be mapped if the sub-region to be mapped belongs to the second sub-region.

In a device embodiment of the present disclosure, if a type of a MPBCH symbol to be mapped of the second sub-region determined by the second mode determining unit is provided with a preset CRS resource in the original MPBCH resource mapping region in a matching manner;

the first mapping unit 3202 is configured to map the MPBCH symbol to be mapped and the corresponding CRS resource to the second sub-region.

In a device embodiment of the present disclosure, the preset MTC transmission mode may include any of the following modes:

machine type communication frequency division duplex normal cyclic prefix MTC FDD Normal CP mode;

machine type communication frequency division duplex extended cyclic prefix MTC FDD Extended CP mode;

machine type communication time division duplex normal cyclic prefix MTC TDD Normal CP mode; and machine type communication time division duplex extended cyclic prefix MTC TDD Extended CP mode;

a resource mapping manner of any mode in the data region of the preset sub-frame is same as a resource mapping manner in the original LTE system.

Correspondingly, the present disclosure also provides a device for transmitting MTC system information, which is provided in a machine type communication MTC apparatus that supports searching for preset MTC system information from a target resource region. A time region of the target resource region is a time region of a control region of a preset sub-frame in an original LTE system, a frequency region is a frequency resource region occupied by preset MTC system information in the original LTE system, and the preset sub-frame is a sub-frame that carries the preset MTC system information.

Figure 23:
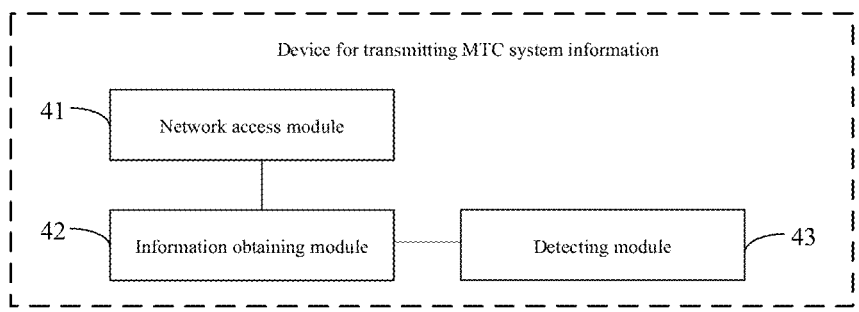
FIG. 23 is a block diagram showing a device for transmitting MTC system information, according to an example of the present disclosure.

Referring to FIG. 23, which is a block diagram showing a device for transmitting MTC system information according to an embodiment, the device may include:

a network access module 41, configured to obtain the preset MTC system information for accessing a cell network from a data region of the preset sub-frame, and access the cell network, wherein a time region of the data region is a time region excluding the control region in the preset sub-frame, and a frequency region of the data region corresponds to a frequency resource region occupied by the preset MTC system information in the original LTE system;

in a device embodiment of the present disclosure, the preset MTC system information includes: a master information block MIB of the MTC system;

a control region of the preset sub-frame includes: a time region corresponding to first three OFDM symbols of the preset sub-frame and a frequency resource region occupied by the master information block MIB of the MTC system;

an information obtaining module 42, configured to obtain broadcast configuration information sent by a base station, wherein the broadcast configuration information is configured to inform the MTC apparatus of a mapping range of a target physical resource in the preset sub-frame, and the target physical resource is configured to carry the preset MTC system information; and a detecting module 43, configured to detect the preset MTC system information in the preset sub-frame according to the broadcast configuration information.

Figure 24:
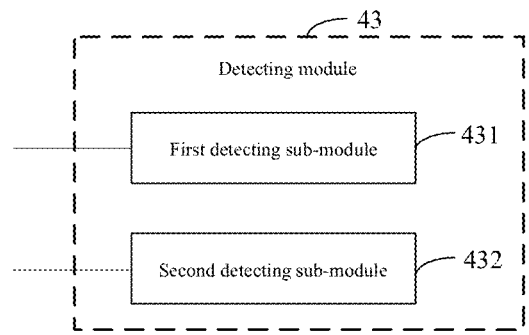
FIG. 24 is a block diagram showing another device for transmitting MTC system information, according to an example of the present disclosure.

Referring to FIG. 24, which is a block diagram showing another device for transmitting MTC system information according to an embodiment, based on the device embodiment shown in FIG. 23, the detecting module 43 may include:

a first detecting sub-module 431, configured to detect the preset MTC system information in the data region of the preset sub-frame in a case where the broadcast configuration information indicates that a mapping manner of the target physical resource is a first mapping manner; and a second detecting sub-module 432, configured to detect the preset MTC system information in an effective mapping region of the preset sub-frame in a case where the broadcast configuration information indicates that the mapping manner of the target physical resource is a second mapping manner.

The first mapping manner is configured to map the target physical resource to a data region of the preset sub-frame, wherein a time region of the data region corresponds to a time region excluding the control region in the preset sub-frame, and a frequency region of the data region corresponds to a frequency resource region occupied by the preset MTC system information in the original LTE system; and the second mapping manner is configured to map the target physical resource to an effective mapping region of the preset sub-frame, wherein the effective mapping region of the preset sub-frame is a time-frequency region excluding a cell reference signal resource in the preset sub-frame.

Figure 25:
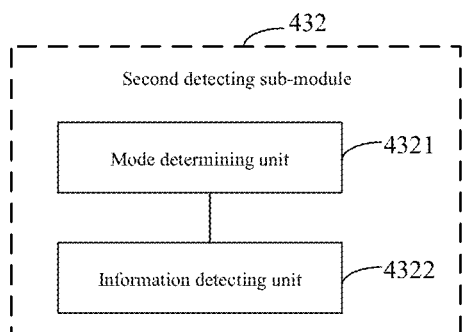
FIG. 25 is a block diagram showing another device for transmitting MTC system information, according to an example of the present disclosure.

Referring to FIG. 25, which is a block diagram showing another device for transmitting MTC system information according to an embodiment, based on the device embodiment shown in FIG. 24, the second detecting sub-module 432 may include:

a mode determining unit 4321, configured to determine a target mapping sub-manner for the target resource region according to a MTC transmission mode of a current cell; and an information detecting unit 4322, configured to detect the preset MTC system information in the effective mapping region of the preset sub-frame according to the target mapping sub-manner.

In a device embodiment of the present disclosure, the mode determining unit 4321 may be configured to query a preset resource mapping list according to the MTC transmission mode of the current cell, and determine the target mapping sub-manner corresponding to the MTC transmission mode, wherein the preset resource mapping list includes: a correspondence between the MTC transmission mode and a preset mapping sub-manner, and the preset mapping sub-manner is configured to indicate how to map a physical broadcast channel PBCH symbol in the target resource region by the base station.

Figure 26:
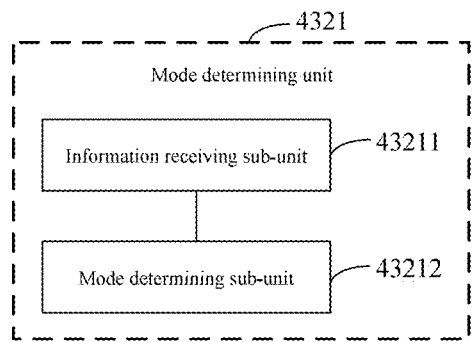
FIG. 26 is a block diagram showing another device for transmitting MTC system information, according to an example of the present disclosure.

Referring to FIG. 26, which is a block diagram showing another device for transmitting MTC system information according to an embodiment, based on the device embodiment shown in FIG. 25, the mode determining unit 4321 may include:

an information receiving sub-unit 43211, configured to receive mode configuration information broadcast by the base station; and a mode determining sub-unit 43212, configured to determine the target mapping sub-manner for the target resource region according to the mode configuration information.

In a device embodiment of the present disclosure, the MTC transmission mode of the current cell may include any of the following modes:

machine type communication frequency division duplex normal cyclic prefix MTC FDD Normal CP mode;

machine type communication frequency division duplex extended cyclic prefix MTC FDD Extended CP mode;

machine type communication time division duplex normal cyclic prefix MTC TDD Normal CP mode; and machine type communication time division duplex extended cyclic prefix MTC TDD Extended CP mode;

a resource mapping manner of any mode in the data region of the preset sub-frame is same as a resource mapping manner in the original LTE system.

Figure 27:
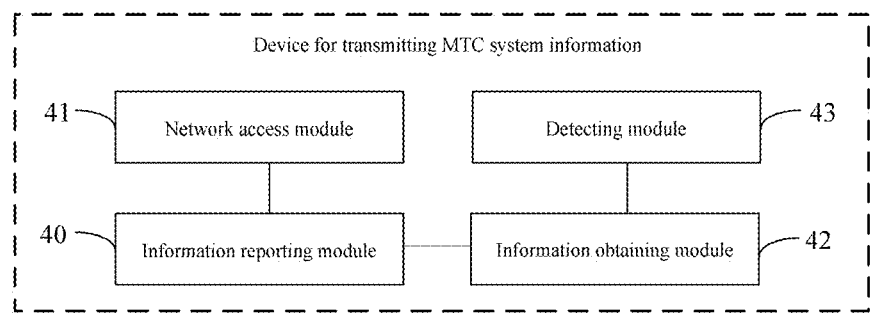
FIG. 27 is a block diagram showing another device for transmitting MTC system information, according to an example of the present disclosure.

Referring to FIG. 27, which is a block diagram showing another device for transmitting MTC system information according to an embodiment, based on the device embodiment shown in FIG. 23, the device may further include:

an information reporting module 40, configured to report apparatus ability information to the base station, wherein the apparatus ability information is configured to indicate whether the MTC apparatus has an ability of searching for the preset MTC system information from the target resource region, so that the base station determines an information detection ability of the MTC apparatus.

As for the device embodiments, since they basically correspond to the method embodiments, the relevant parts can be referred to the description of the method embodiments. The device embodiments described above are only examples. The units described as separated parts may or may not be physically separated, and the parts displayed as units may or may not be physical units, that is, the units may be located in one place, or may be distributed over multiple network units. Some or all of the units may be selected according to actual needs to achieve the objectives of the improvement of the present disclosure. Those of ordinary skill in the art can understand and implement without paying creative labor.

Correspondingly, one aspect provides a base station, including: a processor; and a memory for storing processor executable instructions. The processor is configured to: determine information detection ability of a machine type communication MTC apparatus in a cell, wherein the information detection ability represents whether the MTC apparatus supports searching for preset MTC system information from a target resource region, a time region of the target resource region is a time region of a control region of a preset sub-frame in an original LTE system, a frequency region is a frequency resource region occupied by preset MTC system information in the original LTE system, and the preset sub-frame is a sub-frame that carries the preset MTC system information; map a target physical resource in a time-frequency region corresponding to the preset sub-frame according to the information detection ability and a preset resource mapping manner, wherein the target physical resource is configured to carry the preset MTC system information; and broadcast the preset MTC system information by the target physical resource.

On the other hand, there is provided a terminal, which belongs to an MTC apparatus and may include: a processor; and a memory for storing processor executable instructions. The processor is configured to: obtain the preset MTC system information for accessing a cell network from a data region of the preset sub-frame, and access the cell network, wherein a time region of the data region is a time region excluding the control region in the preset sub-frame, and a frequency region of the data region corresponds to a frequency resource region occupied by the preset MTC system information in the original LTE system; obtain broadcast configuration information sent by a base station, wherein the broadcast configuration information is configured to inform the MTC apparatus of a mapping range of a target physical resource in the preset sub-frame, and the target physical resource is configured to carry the preset MTC system information; and detect the preset MTC system information in the preset sub-frame according to the broadcast configuration information.

Figure 28:
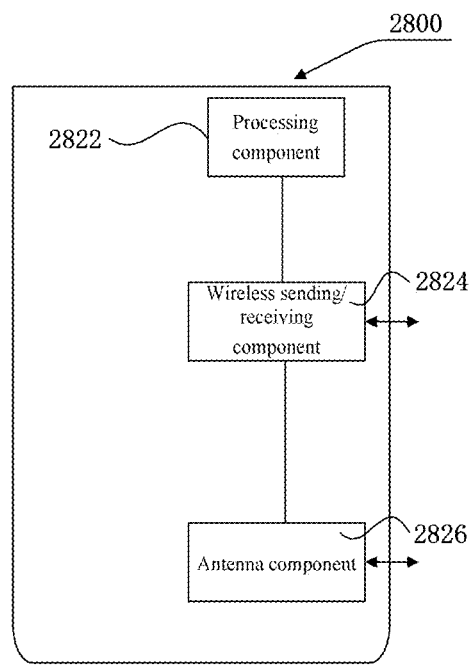
FIG. 28 is a schematic structural diagram showing a base station, according to an example of the present disclosure.

As shown in FIG. 28, FIG. 28 is a schematic structural diagram showing a base station 2800 according to an embodiment. Referring to FIG. 28, the base station 2800 includes a processing component 2822, a wireless sending/receiving component 2824, an antenna component 2828, and a signal processing part specific to the wireless interface. The processing component 2822 may further include one or more processors.

One of the processors in the processing component 2822 can be configured to:

determine information detection ability of a machine type communication MTC apparatus in a cell, wherein the information detection ability represents whether the MTC apparatus supports searching for preset MTC system information from a target resource region, a time region of the target resource region is a time region of a control region of a preset sub-frame in an original LTE system, a frequency region is a frequency resource region occupied by preset MTC system information in the original LTE system, and the preset sub-frame is a sub-frame that carries the preset MTC system information;

map a target physical resource in a time-frequency region corresponding to the preset sub-frame according to the information detection ability and a preset resource mapping manner, wherein the target physical resource is configured to carry the preset MTC system information; and broadcast the preset MTC system information by the target physical resource.

In one or more embodiments, there is also provided a non-transitory computer-readable storage medium including instructions and having computer instructions stored thereon. The computer instructions can be executed by the processing component 2822 of the base station 2800 to complete any one of the methods for transmitting MTC system information in FIG. 2 to FIG. 11. For example, the non-transitory computer-readable storage medium may be a ROM, a random-access memory (RAM), a CD-ROM, a magnetic tape, a floppy disk, an optical data storage device, etc.

Figure 29:
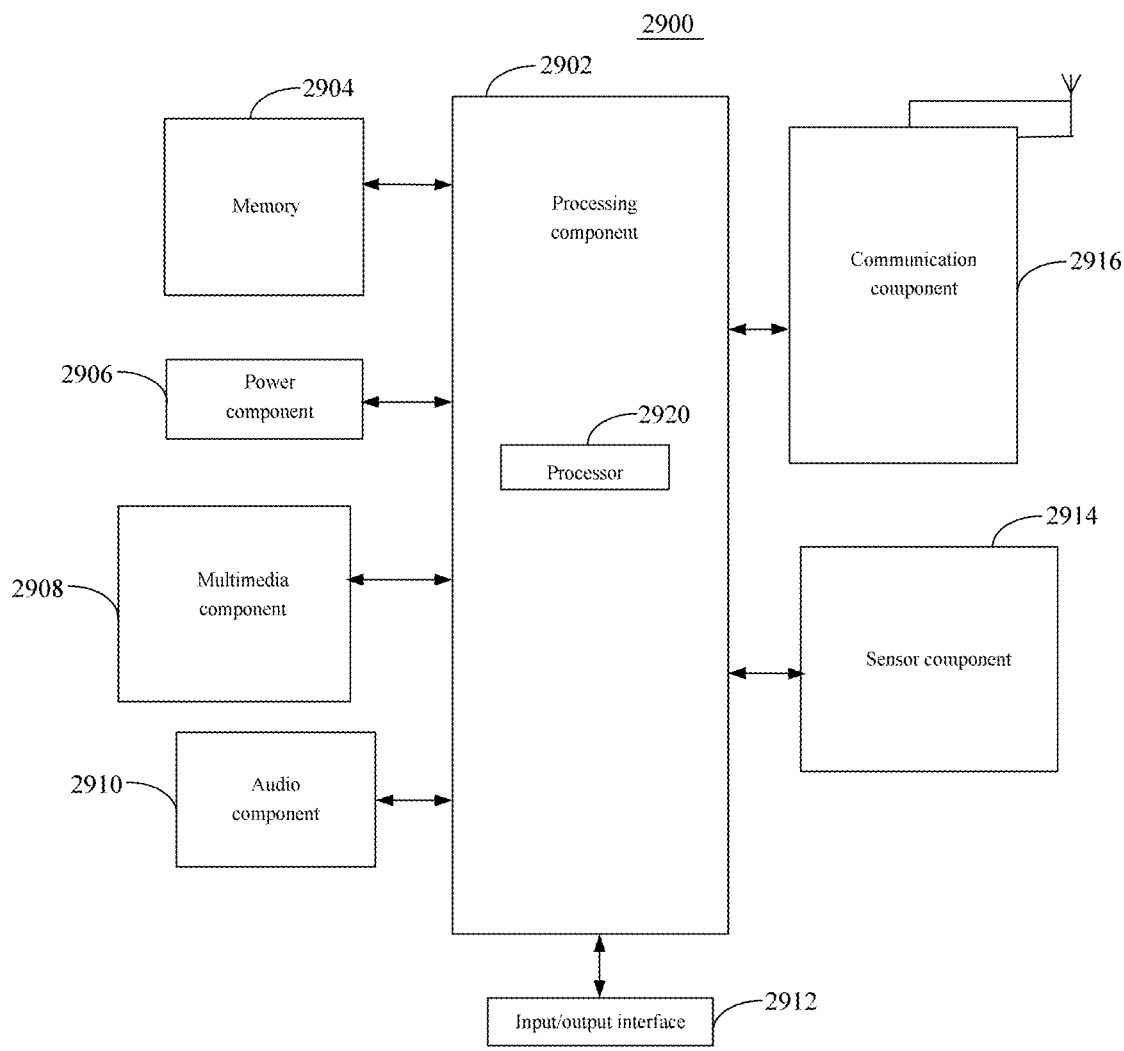
FIG. 29 is a schematic structural diagram showing a terminal, according to an example of the present disclosure.

FIG. 29 is a schematic structural diagram showing a terminal 2900 according to an embodiment. For example, the terminal 2900 may be a terminal that supports machine type communication MTC services, and may specifically be a mobile phone, a computer, a digital broadcasting terminal, a messaging device, a game console, a tablet device, a medical device, a fitness device, a personal digital assistant, and a smart meter, a smart transportation tool such as shared bicycles, a wearable device such as a smart watch, smart glasses, a smart bracelet, smart running shoes, etc.

Referring to FIG. 29, the terminal 2900 may include one or more of the following components: a processing component 2902, a memory 2904, a power component 2906, a multimedia component 2908, an audio component 2910, an input/output (I/O) interface 2912, a sensor component 2914, and a communication component 2916.

The processing component 2902 typically controls the overall operations of the device 2900, such as the operations associated with display, telephone calls, data communications, camera operations, and recording operations. The processing component 2902 can include one or more processors 2920 to execute instructions to perform all or part of the steps in the above described methods. Moreover, the processing component 2902 can include one or more modules to facilitate the interaction between the processing component 2902 and other components. For example, the processing component 2902 can include a multimedia module to facilitate the interaction between the multimedia component 2908 and the processing component 2902.

The memory 2904 is configured to store various types of data to support the operation of the device 2900. Examples of such data include instructions for any application or method operated on device 2900, such as the contact data, the phone book data, messages, pictures, videos, and the like. The memory 2904 can be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2906 provides power to various components of the device 2900. The power component 2906 can include a power management system, one or more power sources, and other components associated with the generation, management, and distribution of power in the device 2900.

The multimedia component 2908 includes a screen providing an output interface between the device 2900 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2908 includes a front camera and/or a rear camera. When the device 2900 is in an operation mode, such as a photographing mode or a video mode, the front camera and/or the rear camera can receive external multimedia datum. Each of the front camera and the rear camera may be a fixed optical lens system or have focus and optical zoom ability.

The audio component 2910 is configured to output and/or input an audio signal. For example, the audio component 2910 includes a microphone (MIC) configured to receive an external audio signal when the device 2900 is in an operation mode, such as a call mode, a recording mode, and a voice recognition mode. The received audio signal may be further stored in the memory 2904 or sent via the communication component 2916. In some embodiments, the audio component 2910 also includes a speaker for outputting the audio signal.

The I/O interface 2912 provides an interface between the processing component 2902 and peripheral interface modules, such as a keyboard, a click wheel, buttons, and the like. These buttons may include, but are not limited to, a home button, a volume button, a starting button, and a locking button.

The sensor component 2914 includes one or more sensors for providing status assessments of various aspects of the device 2900. For example, the sensor component 2914 can detect an open/closed status of the device 2900, relative positioning of components, such as the display and the keypad of the device 2900. The sensor component 2914 can also detect a change in position of one component of the device 2900 or the device 2900, the presence or absence of user contact with the device 2900, an orientation, or an acceleration/deceleration of the device 2900, and a change in temperature of the device 2900. The sensor component 2914 can include a proximity sensor configured to detect the presence of nearby objects without any physical contact. The sensor component 2914 can also include a light sensor, such as a CMOS or CCD image sensor, configured to use in imaging applications. In some embodiments, the sensor component 2914 can also include an accelerometer sensor, a gyroscope sensor, a magnetic sensor, a pressure sensor, or a temperature sensor.

The communication component 2916 is configured to facilitate wired or wireless communication between the device 2900 and other devices. The device 2900 can access a wireless network based on a communication standard, such as WiFi, 2G or 3G, or a combination thereof. In one or more embodiments, the communication component 2916 receives broadcast signals or broadcast associated information from an external broadcast management system via a broadcast channel. In one or more embodiments, the communication component 2916 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In one or more embodiments, the device 2900 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In one or more embodiments, there is also provided a non-transitory computer-readable storage medium including instructions, such as a memory 2904 including instructions executable by the processor 2920 of the device 2900 to complete the method for transmitting MTC system information described in any one of FIGS. 12 to 15 above. For example, the non-transitory computer readable storage medium may be a ROM, a random-access memory (RAM), a CD-ROM, a magnetic tape, a floppy disc, and an optical data storage device.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for transmitting machine type communication (MTC) system information, applied to a base station, the method comprising:
    determining an information detection ability of an MTC apparatus in a cell, wherein the information detection ability comprises whether the MTC apparatus supports searching for preset MTC system information from a target resource region, wherein a time region of the target resource region is a time region of a control region of a preset sub-frame in an original long term evolution (LTE) system, wherein a frequency region of the target resource region is a frequency resource region occupied by the preset MTC system information in the original LTE system, and wherein the preset sub-frame is a sub-frame that carries the preset MTC system information;
    mapping a target physical resource in a time-frequency region corresponding to the preset sub-frame according to the information detection ability and a preset resource mapping manner, wherein the target physical resource is configured to carry the preset MTC system information; and
    broadcasting the preset MTC system information by the target physical resource.

2. The method according to claim 1, wherein the preset MTC system information comprises a master information block (MIB) of a MTC system, and
    wherein the control region of the preset sub-frame comprises a time region corresponding to first three orthogonal frequency division multiplexing (OFDM) symbols of the preset sub-frame and a frequency resource region corresponding to the MIB of the MTC system.

3. The method according to claim 1, wherein the preset resource mapping manner comprises:
    a first mapping manner, configured to map the target physical resource to a data region of the preset sub-frame, wherein a time region of the data region corresponds to a time region excluding the control region in the preset sub-frame, and wherein a frequency region of the data region corresponds to the frequency resource region occupied by the preset MTC system information in the original LTE system; and
    a second mapping manner, configured to map the target physical resource to an effective mapping region of the preset sub-frame, wherein the effective mapping region of the preset sub-frame is a time-frequency region excluding a cell reference signal (CRS) resource in the preset sub-frame.

4. The method according to claim 1, wherein determining the information detection ability of the MTC apparatus in the cell comprises:
    obtaining apparatus ability information reported by the MTC apparatus; and
    determining the information detection ability of the MTC apparatus according to the apparatus ability information.

5. The method according to claim 4, wherein determining the information detection ability of the MTC apparatus according to the apparatus ability information comprises:
    determining, when a preset indication value is a first indication value, that the MTC apparatus supports searching for the preset MTC system information in the target resource region, wherein the apparatus ability information comprises the preset indication value for indicating the information detection ability; and
    determining, when the preset indication value is a second indication value, that the MTC apparatus does not support searching for the preset MTC system information in the target resource region.

6. The method according to claim 3, wherein mapping the target physical resource in the time-frequency region corresponding to the preset sub-frame according to the information detection ability and the preset resource mapping manner comprises:
    determining a target resource mapping manner of the target physical resource, wherein the target resource mapping manner is the first mapping manner or the second mapping manner;
    generating broadcast configuration information according to the target resource mapping manner, wherein the broadcast configuration information is configured to inform the MTC apparatus of a mapping range of the target physical resource in the preset sub-frame;
    sending the broadcast configuration information to the MTC apparatus by a broadcast signaling; and
    mapping the target physical resource in the time-frequency region corresponding to the preset sub-frame according to the target resource mapping manner.

7. The method according to claim 3, wherein mapping the target physical resource in the time-frequency region corresponding to the preset sub-frame according to the information detection ability and the preset resource mapping manner comprises:
    mapping, when the MTC apparatus does not support searching for the preset MTC system information from the target resource region, the target physical resource in the preset sub-frame according to the first mapping manner.

8. The method according to claim 3, wherein mapping the target physical resource in the time-frequency region corresponding to the preset sub-frame according to the information detection ability and the preset resource mapping manner comprises:

mapping, when the MTC apparatus supports searching for the preset MTC system information from the target resource region, the target physical resource in the preset sub-frame according to the second mapping manner.

9. The method according to claim 8, wherein mapping the target physical resource in the preset sub-frame according to the second mapping manner comprises:

determining a target mapping sub-manner for the target resource region according to a preset MTC transmission mode, wherein the target mapping sub-manner is configured to indicate how to map the target physical resource in the target resource region;

mapping the target physical resource in the target resource region according to the target mapping sub-manner; and mapping the target physical resource in the data region of the preset sub-frame according to a target physical resource mapping manner of the original LTE system.

10. The method according to claim 9, wherein determining the target mapping sub-manner for the target resource region according to the preset MTC transmission mode comprises:

querying a preset resource mapping list according to a MTC transmission mode of a current cell; and determining the target mapping sub-manner corresponding to the MTC transmission mode, wherein the preset resource mapping list comprises a correspondence between the MTC transmission mode and a preset mapping sub-manner.

11. The method according to claim 9, wherein determining the target mapping sub-manner for the target resource region according to the preset MTC transmission mode comprises:

determining the target mapping sub-manner according to a type of a CRS resource mapped in the target resource region in the preset MTC transmission mode;

generating mode configuration information according to the target mapping sub-manner; and broadcasting the mode configuration information by a preset broadcast signaling, so that the MTC apparatus determines the mapping manner of the target physical resource in the target resource region according to the mode configuration information.

12. The method according to claim 11, wherein determining the target mapping sub-manner according to the type of the CRS resource mapped in the target resource region in the preset MTC transmission mode comprises:

determining a sub-region type of a sub-region to be mapped, wherein the sub-region type comprises a first sub-region and a second sub-region, and wherein, for the sub-region type, only the first sub-region is mapped with the CRS resource;

determining, when the sub-region to be mapped belongs to the first sub-region, a type of a machine physical broadcast channel (MPBCH) symbol to be mapped according to a type of the CRS resource of the sub-region to be mapped and a resource mapping manner of an original MPBCH resource mapping region; and determining, the sub-region to be mapped belongs to the second sub-region, any type of the MPBCH symbol as the MPBCH symbol to be mapped.

13. The method according to claim 12, wherein mapping the target physical resource in the target resource region according to the target mapping sub-manner comprises:

mapping, when the any type of the MPBCH symbol to be mapped for the second sub-region comprises a preset CRS resource in the original MPBCH resource mapping region in a matching manner, the MPBCH symbol to be mapped and the corresponding CRS resource to the second sub-region.

14. The method according to claim 9, wherein the preset MTC transmission mode comprises:

machine type communication frequency division duplex normal cyclic prefix MTC FDD Normal CP mode;

machine type communication frequency division duplex extended cyclic prefix MTC FDD Extended CP mode;

machine type communication time division duplex normal cyclic prefix MTCTDD Normal CP mode; or machine type communication time division duplex extended cyclic prefix MTC TDD Extended CP mode, wherein a resource mapping manner of any mode in the data region of the preset sub-frame is same as a resource mapping manner in the original LTE system.

15. A method for transmitting machine type communication (MTC) system information, applied to an MTC apparatus, the method comprising:

obtaining preset MTC system information for accessing a cell network from a data region of a preset sub-frame, wherein the MTC apparatus supports searching for the preset MTC system information from a target resource region, a time region of the target resource region is a time region of a control region of the preset sub-frame in an original long term evolution LTE system, a frequency region of the target resource region is a frequency resource region occupied by the preset MTC system information in the original LTE system, and the preset sub-frame is a sub-frame that carries the preset MTC system information;

accessing the cell network, wherein a time region of the data region is a time region excluding the control region in the preset sub-frame, and a frequency region of the data region corresponds to the frequency resource region occupied by the preset MTC system information in the original LTE system;

obtaining broadcast configuration information sent by a base station, wherein the broadcast configuration information is configured to inform the MTC apparatus of a mapping range of a target physical resource in the preset sub-frame, and the target physical resource is configured to carry the preset MTC system information; and detecting the preset MTC system information in the preset sub-frame according to the broadcast configuration information.

16. The method according to claim 15, wherein the preset MTC system information comprises a master information block (MIB) of the MTC system, and wherein the control region of the preset sub-frame comprises a time region corresponding to first three orthogonal frequency division multiplexing (OFDM) symbols of the preset sub-frame and a frequency resource region occupied by the MIB of the MTC system.

17. The method according to claim 15, wherein detecting the preset MTC system information in the preset sub-frame according to the broadcast configuration information comprises:
- detecting, when the broadcast configuration information indicates that a mapping manner of the target physical resource is a first mapping manner, the preset MTC system information in the data region of the preset sub-frame; and
- detecting, when the broadcast configuration information indicates that the mapping manner of the target physical resource is a second mapping manner, the preset MTC system information in an effective mapping region of the preset sub-frame,
- wherein the first mapping manner is configured to map the target physical resource to the data region of the preset sub-frame, wherein the time region of the data region corresponds to the time region excluding the control region in the preset sub-frame, and the frequency region of the data region corresponds to the frequency resource region occupied by the preset MTC system information in the original LTE system,
- wherein the second mapping manner is configured to map the target physical resource to the effective mapping region of the preset sub-frame, and wherein the effective mapping region of the preset sub-frame is a time-frequency region excluding a cell reference signal (CRS) resource in the preset sub-frame.

18. The method according to claim 17, wherein detecting the preset MTC system information in the effective mapping region of the preset sub-frame comprises:
- determining a target mapping sub-manner for the target resource region according to a MTC transmission mode of a current cell; and
- detecting the preset MTC system information in the effective mapping region of the preset sub-frame according to the target mapping sub-manner.

19. A computing device, comprising:
- one or more processors; and
- a non-transitory computer readable storage medium storing instructions executable by the one or more processors, wherein, the one or more processors are configured to:
- determine information detection ability of a machine type communication MTC apparatus in a cell, wherein the information detection ability comprises whether the MTC apparatus supports searching for preset MTC system information from a target resource region, a time region of the target resource region is a time region of a control region of a preset sub-frame in an original LTE system, a frequency region of the target resource region is a frequency resource region occupied by the preset MTC system information in the original LTE system, and the preset sub-frame is a sub-frame that carries the preset MTC system information;
- map a target physical resource in a time-frequency region corresponding to the preset sub-frame according to the information detection ability and a preset resource mapping manner, wherein the target physical resource is configured to carry the preset MTC system information; and
- broadcast the preset MTC system information by the target physical resource.

* * * * *